(12) United States Patent
Tepper et al.

(10) Patent No.: US 10,641,014 B2
(45) Date of Patent: May 5, 2020

(54) ADVANCED BIKE LOCKING SYSTEM AND METHOD

(71) Applicant: Urban Wheely Inc., New York, NY (US)

(72) Inventors: Chad Tepper, New York, NY (US); Robert George Gingher, West Islip, NY (US); Kevin Tyler Egan, New York, NY (US); Miklos Bergou, New York, NY (US)

( * ) Notice: Subject to any disclaimer, the term of this patent is extended or adjusted under 35 U.S.C. 154(b) by 0 days.

(21) Appl. No.: 14/584,715

(22) Filed: Dec. 29, 2014

(65) Prior Publication Data

US 2015/0330109 A1 Nov. 19, 2015

Related U.S. Application Data

(63) Continuation-in-part of application No. 13/402,478, filed on Feb. 22, 2012, now abandoned.

(60) Provisional application No. 62/075,854, filed on Nov. 5, 2014, provisional application No. 61/445,284, filed on Feb. 22, 2011.

(51) Int. Cl.
| | |
|---|---|
| *E05B 71/00* | (2006.01) |
| *G05B 15/02* | (2006.01) |
| *G07C 9/00* | (2020.01) |
| *B62H 5/00* | (2006.01) |
| *B62H 3/08* | (2006.01) |
| *B62H 5/20* | (2006.01) |

(Continued)

(52) U.S. Cl.
CPC ............... *E05B 71/00* (2013.01); *B62H 3/08* (2013.01); *B62H 5/003* (2013.01); *B62H 5/20* (2013.01); *G05B 15/02* (2013.01); *G07C 9/00571* (2013.01); *G07C 9/33* (2020.01); *B62H 2003/005* (2013.01)

(58) Field of Classification Search
CPC .......... G06K 17/00; G06K 2017/0045; G06K 7/10356; G06K 2017/0048; G06Q 10/087; G08B 21/0275; B60R 2325/105; B60R 25/102; B60R 25/24; G07C 9/00571; G07C 9/00142; G07B 15/00; G07F 17/0057
See application file for complete search history.

(56) References Cited

U.S. PATENT DOCUMENTS 3,762,569 A * 10/1973 Spring ..................... B62H 3/00
                                                                         211/5
3,815,721 A * 6/1974 Montoya ................. G07F 17/10
                                                                       194/283

(Continued)

FOREIGN PATENT DOCUMENTS

| EP | 2315192 A1 * | 4/2011 | ............... B62H 3/04 |
| KR | 20100038524 A * | 4/2010 | |

*Primary Examiner* — Steven Lim
*Assistant Examiner* — Muhammad Adnan

(57) ABSTRACT

An advanced automatic system for securing movable goods is disclosed. In particular a parking station for bicycles is disclosed comprising at least one interactive workstation and a plurality of parking kiosks, in which parking stations are installed in a plurality of sites within a city or a limited geographical area and are electronically tied together through an interactive networked computing system. The station features countermeasures to prevent vandalism of the bicycle locked therewithin. The computing system provides the ability for users to reserve spaces and directs users to their reserved space.

6 Claims, 30 Drawing Sheets

(51) Int. Cl.
*G07C 9/33* (2020.01)
*B62H 3/00* (2006.01)

(56) References Cited

U.S. PATENT DOCUMENTS

| | | | | |
|---|---|---|---|---|
| 4,356,831 A * | 11/1982 | Adams | B62J 19/00 | 150/167 |
| 4,433,787 A * | 2/1984 | Cook | B62H 3/00 | 194/902 |
| 4,773,020 A * | 9/1988 | Anderson | B62H 3/04 | 194/900 |
| 5,278,538 A * | 1/1994 | Ainsworth | B62H 3/04 | 180/287 |
| 5,743,411 A * | 4/1998 | Hawkes | B62H 3/04 | 211/19 |
| 5,841,351 A * | 11/1998 | Rey | B62H 5/00 | 340/432 |
| 5,917,407 A * | 6/1999 | Squire | B62H 3/00 | 194/205 |
| 6,010,239 A * | 1/2000 | Hardgrave | G07F 7/00 | 700/213 |
| 6,157,315 A * | 12/2000 | Kokubo | G07B 15/00 | 211/5 |
| 6,384,717 B1 * | 5/2002 | DeVolpi | B62H 3/02 | 194/205 |
| 6,648,300 B2 * | 11/2003 | Chamoun | B66F 3/08 | 254/10 B |
| 6,779,310 B2 * | 8/2004 | Grover | E04H 6/005 | 292/302 |
| 7,472,517 B2 * | 1/2009 | Blume | B62H 3/00 | 211/20 |
| 7,481,027 B2 * | 1/2009 | Blume | B62H 3/04 | 211/17 |
| 7,571,628 B2 | 8/2009 | D'Anieri | | |
| 7,726,160 B2 | 6/2010 | Gagosz et al. | | |
| 7,898,439 B2 | 3/2011 | Bettez et al. | | |
| 7,946,432 B1 * | 5/2011 | Swanson | B62H 3/12 | 211/20 |
| 8,437,873 B2 * | 5/2013 | North | B62H 3/12 | 340/427 |
| 8,508,333 B2 | 8/2013 | Kanof | | |
| 8,678,205 B2 * | 3/2014 | Mercat | B62H 3/02 | 211/5 |
| 8,763,870 B2 * | 7/2014 | Davis | B60R 9/10 | 224/319 |
| 9,056,640 B2 * | 6/2015 | Vineyard | B62H 3/12 | |
| 9,862,440 B2 * | 1/2018 | Steinman | B62H 3/08 | |
| 10,249,128 B1 * | 4/2019 | Yang | G07F 17/0057 | |
| 2002/0174077 A1 * | 11/2002 | Yui | G06O 20/127 | 705/400 |
| 2003/0071097 A1 * | 4/2003 | Dean | B60R 9/048 | 224/319 |
| 2003/0144890 A1 * | 7/2003 | Dan | G06Q 10/02 | 705/5 |
| 2004/0073440 A1 * | 4/2004 | Garbers | G06Q 10/02 | 705/5 |
| 2005/0033634 A1 * | 2/2005 | Pugliese, III | G06Q 10/02 | 705/13 |
| 2005/0280555 A1 * | 12/2005 | Warner, IV | G08G 1/14 | 340/932.2 |
| 2007/0143207 A1 * | 6/2007 | Breen | G06Q 20/102 | 705/40 |
| 2007/0164065 A1 * | 7/2007 | Davis | B60R 9/048 | 224/324 |
| 2007/0239465 A1 | 10/2007 | LeGars | | |
| 2008/0033640 A1 * | 2/2008 | Amano | G01C 21/3476 | 701/414 |
| 2009/0201127 A1 * | 8/2009 | Stobbe | B62H 3/04 | 340/5.6 |
| 2009/0240575 A1 * | 9/2009 | Bettez | G07B 15/02 | 705/13 |
| 2009/0266673 A1 * | 10/2009 | Dallaire | B62H 3/02 | 194/205 |
| 2009/0315737 A1 * | 12/2009 | Gilmour | G07B 15/00 | 340/932.2 |
| 2010/0228405 A1 * | 9/2010 | Morgal | B62H 3/02 | 701/2 |
| 2010/0245128 A1 * | 9/2010 | Kanof | B62H 3/00 | 340/932.2 |
| 2011/0037240 A1 * | 2/2011 | Kritzer | E05B 47/0603 | 280/293 |
| 2012/0191491 A1 * | 7/2012 | Choi | G06Q 10/02 | 705/5 |
| 2012/0196631 A1 * | 8/2012 | Fajstrup Axelsen | G06Q 20/32 | 455/466 |
| 2013/0255336 A1 * | 10/2013 | Desai | E05B 71/00 | 70/431 |
| 2014/0265237 A1 * | 9/2014 | Strother | B62H 5/00 | 280/297 |
| 2015/0074004 A1 * | 3/2015 | Song | G07F 17/0057 | 705/307 |

* cited by examiner

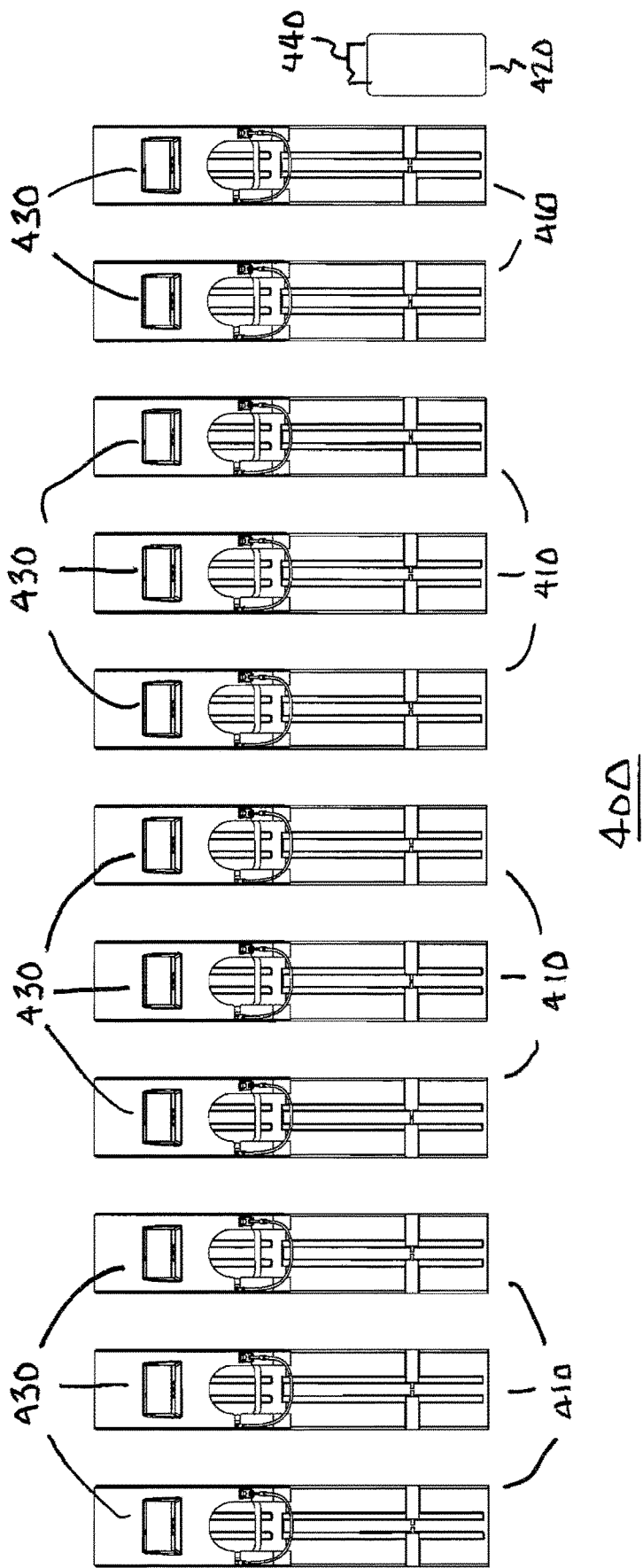

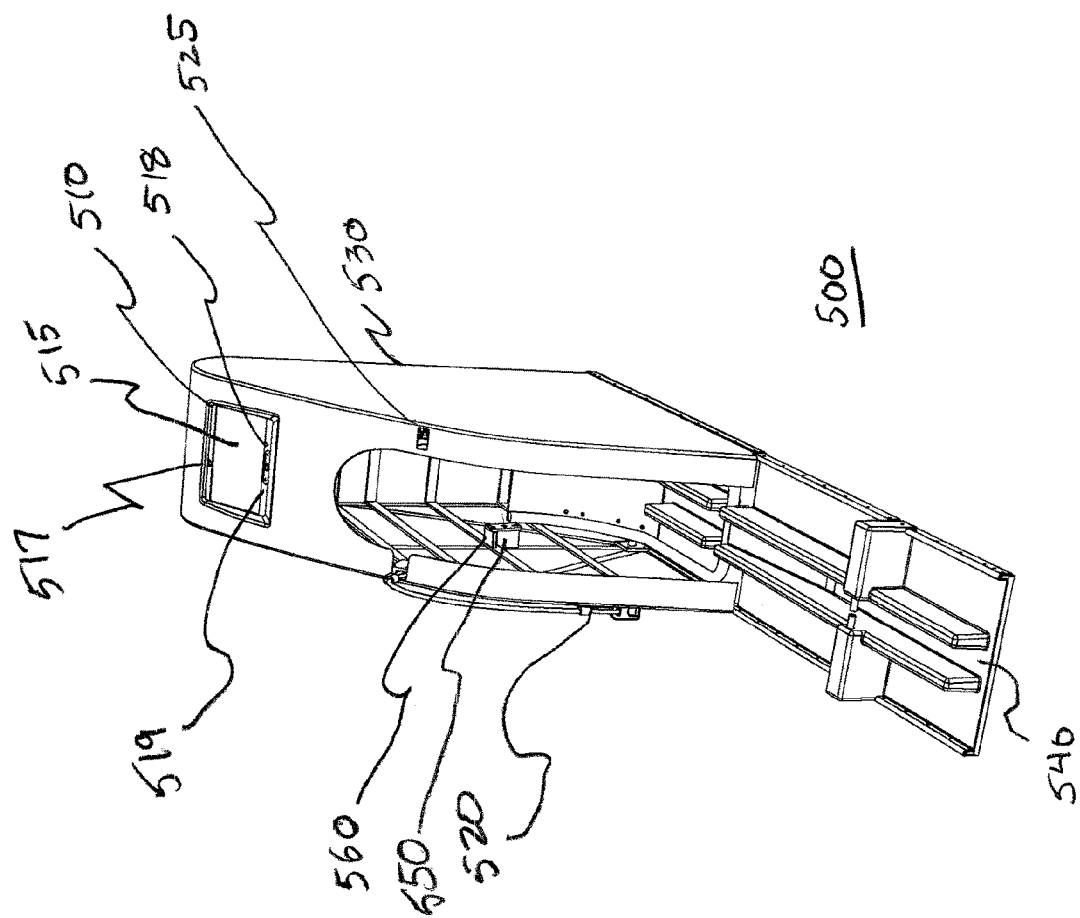

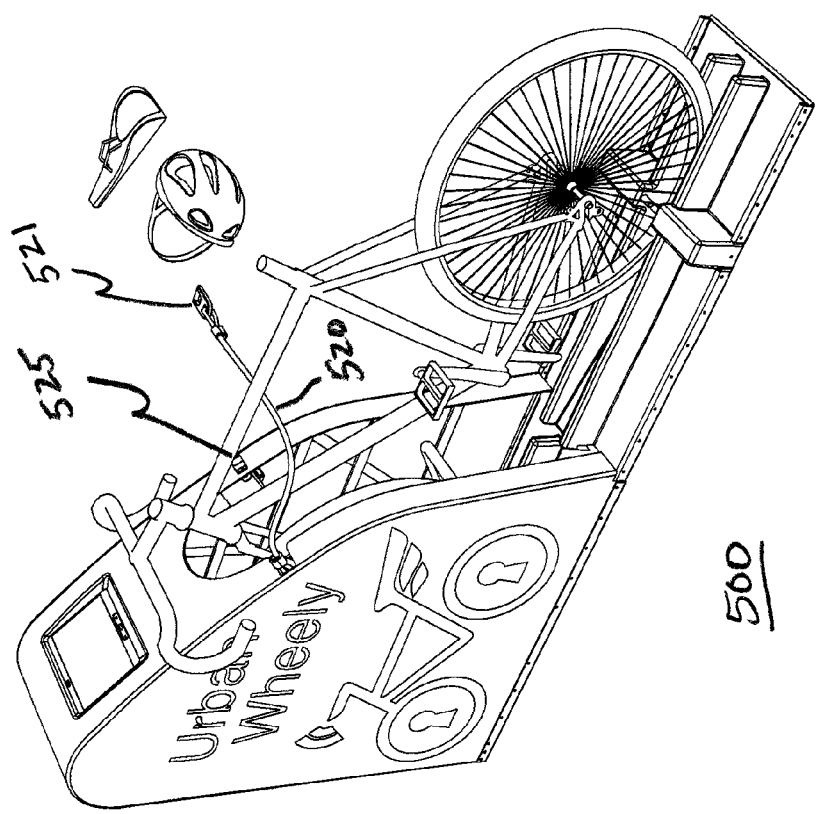

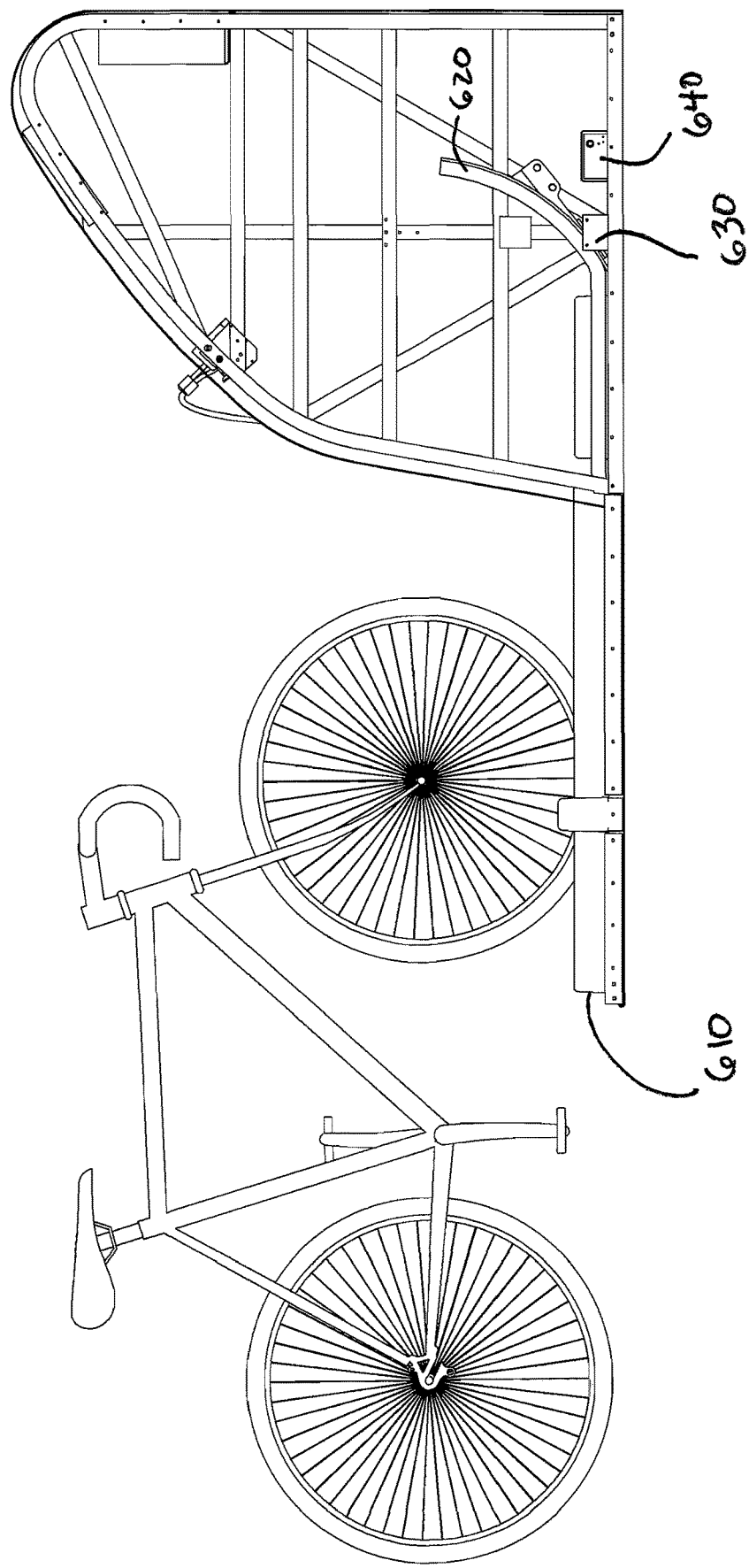

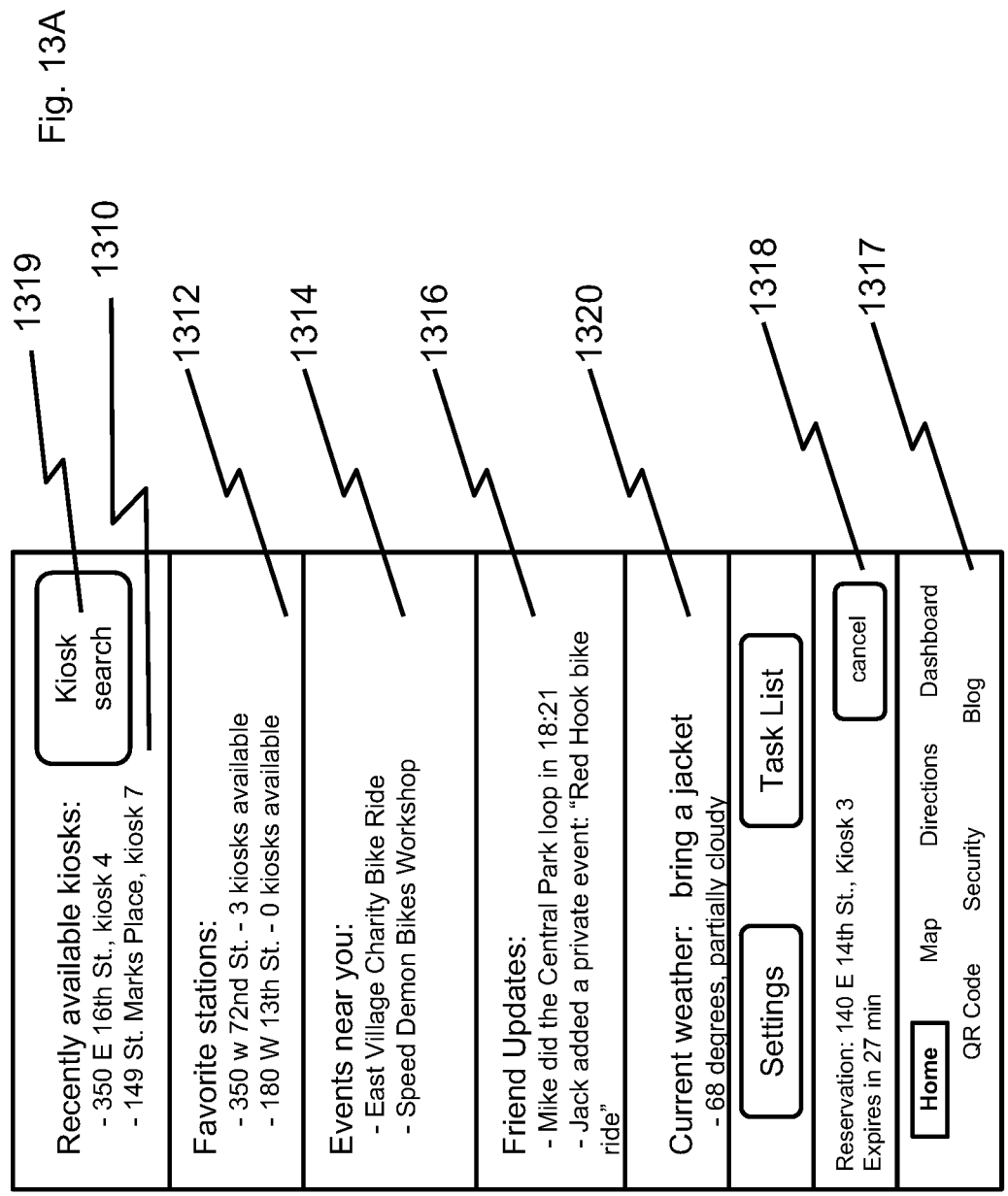

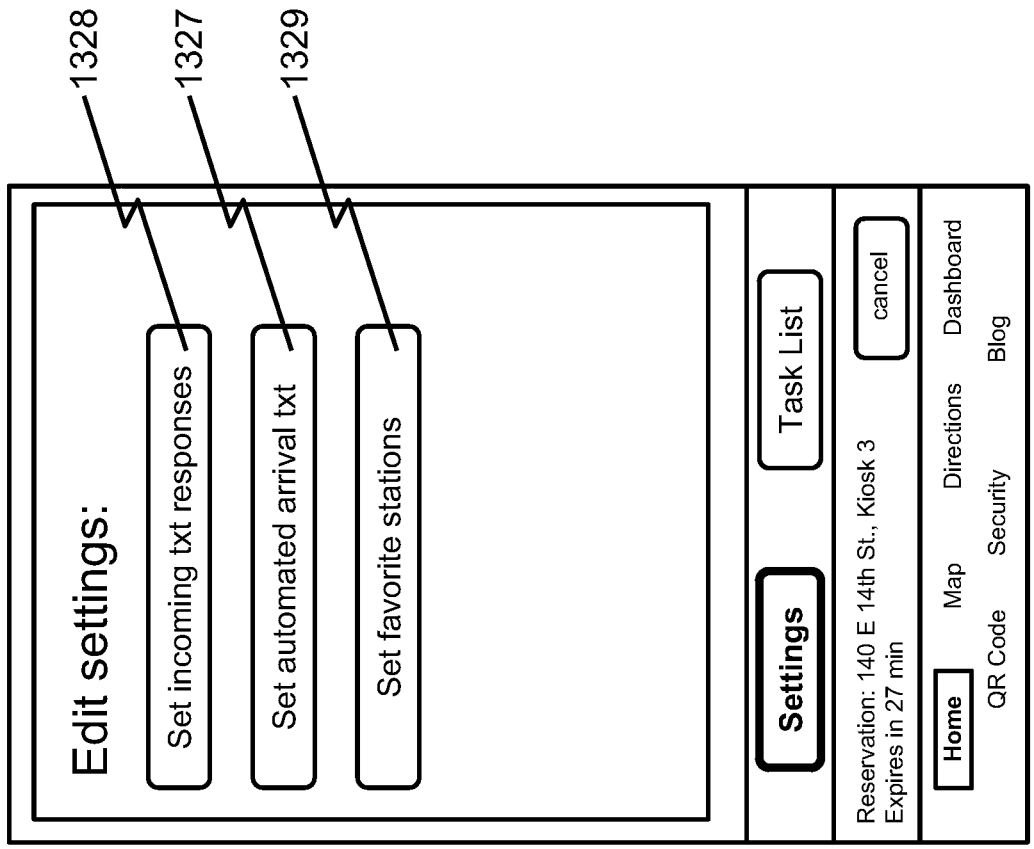
Fig. 13A2

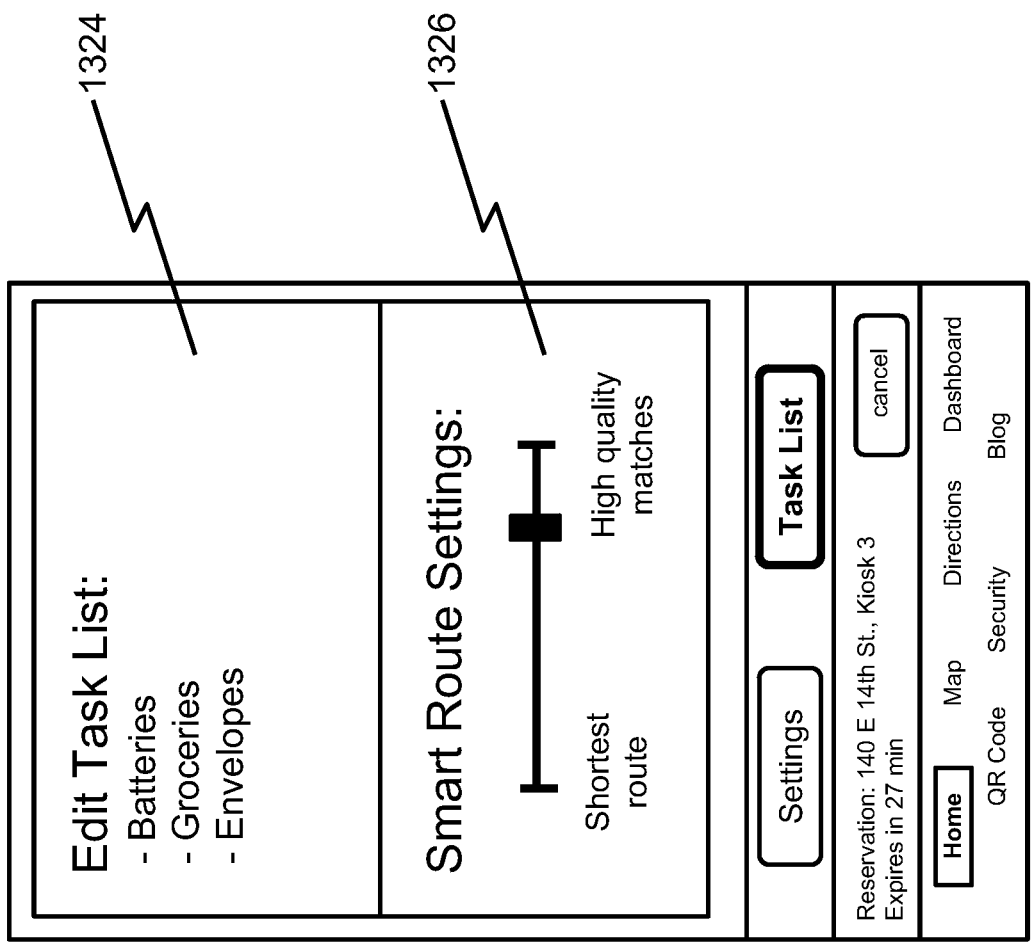
Fig. 13A3

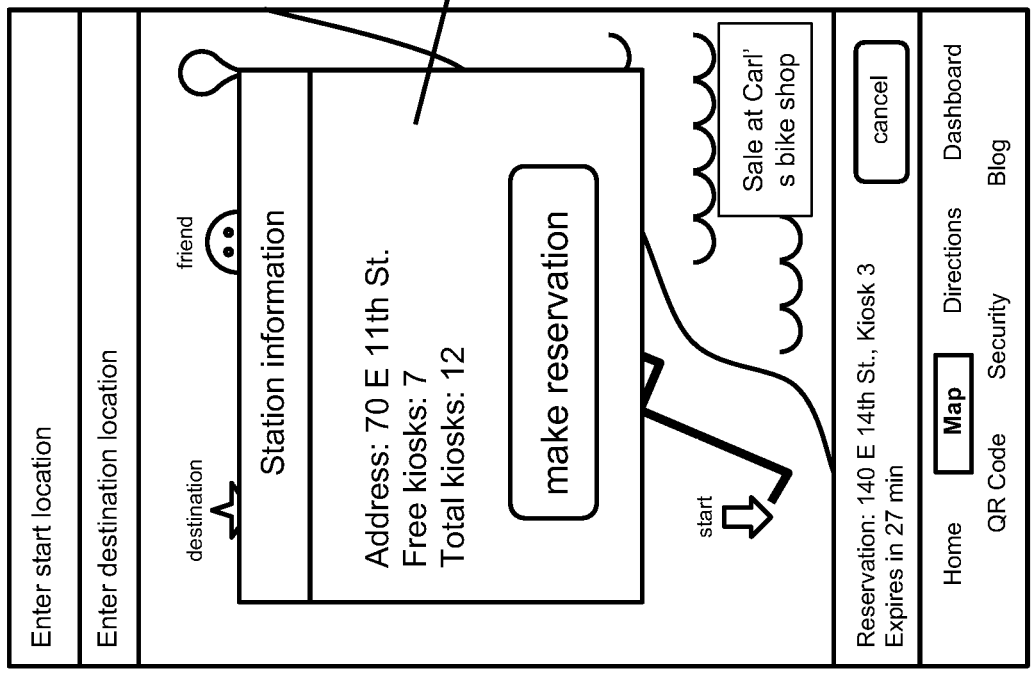

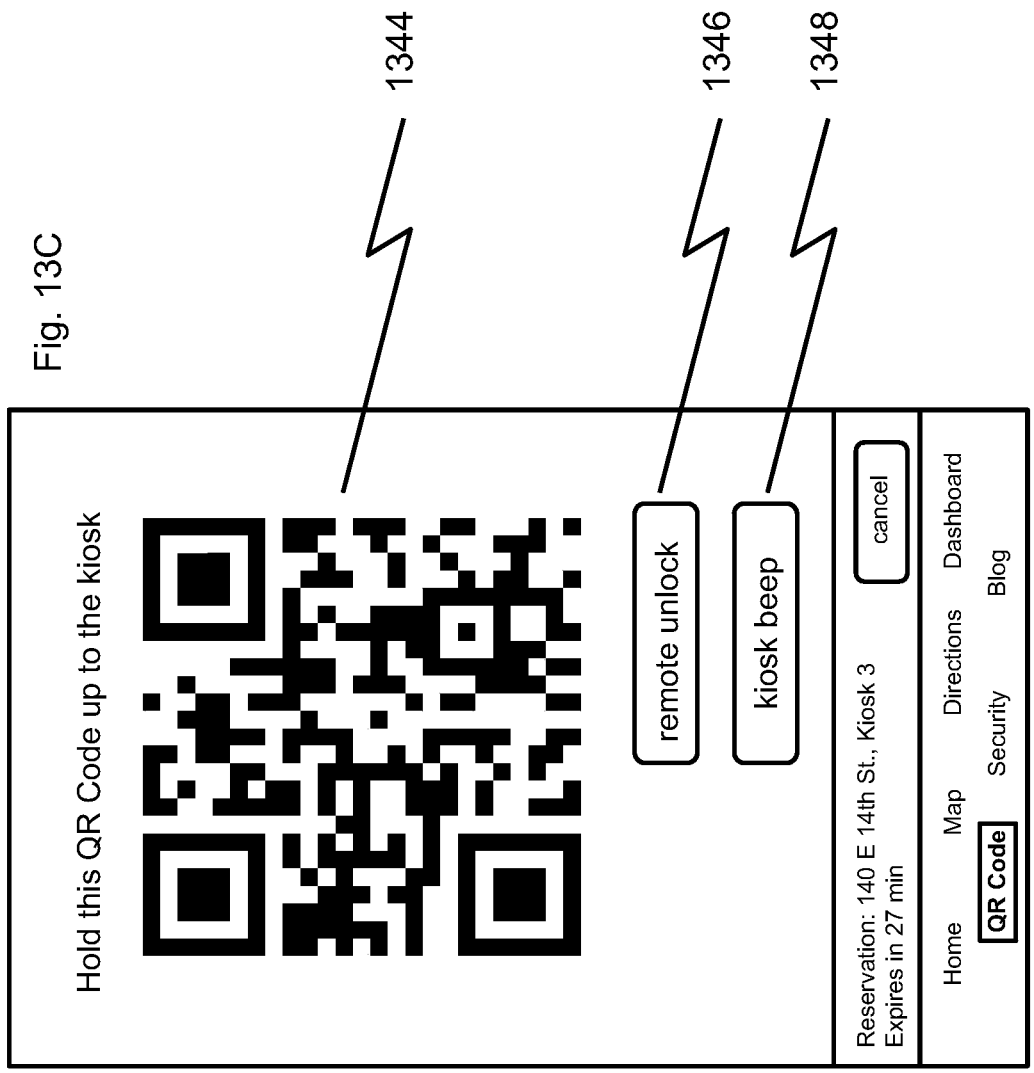

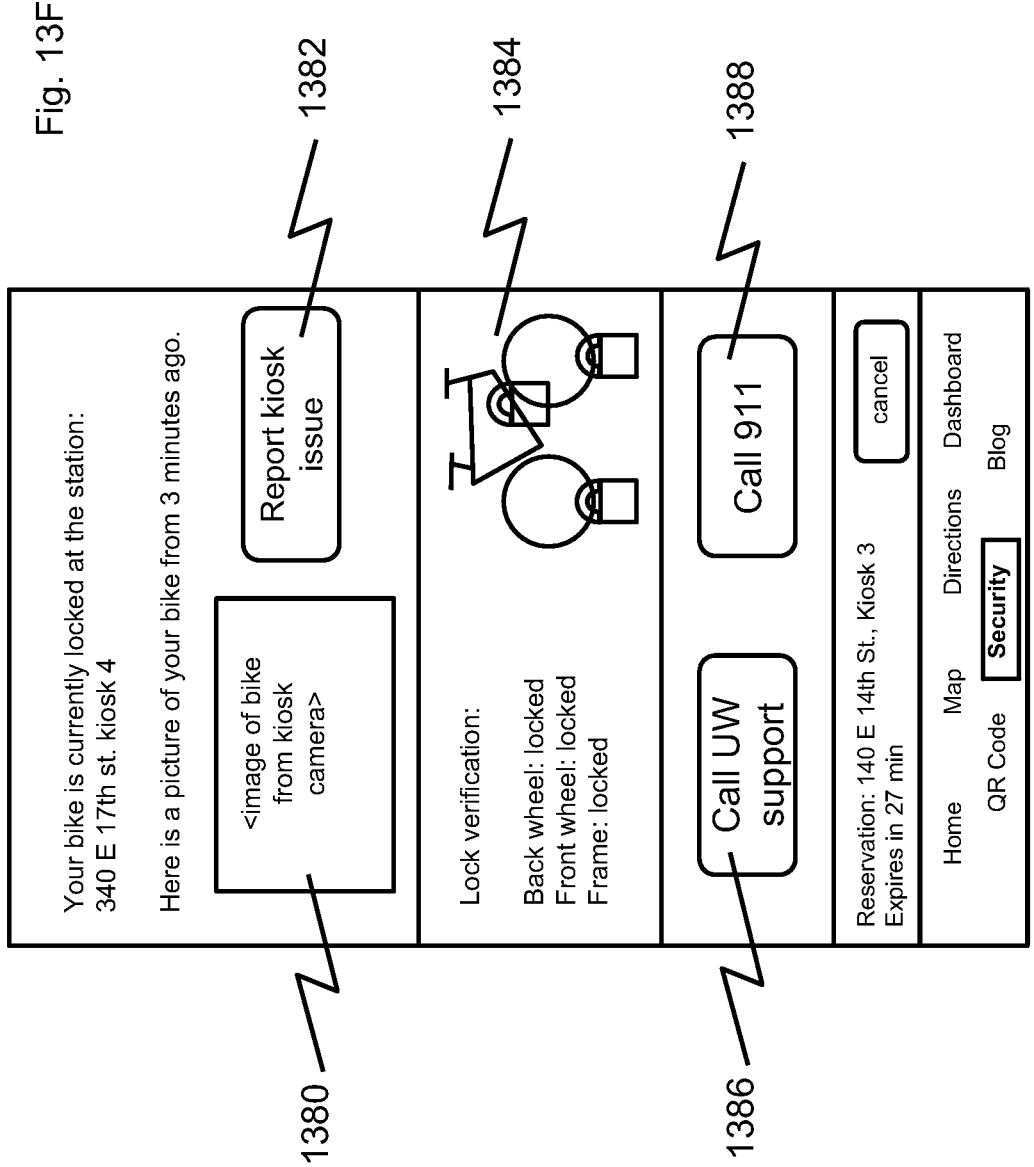

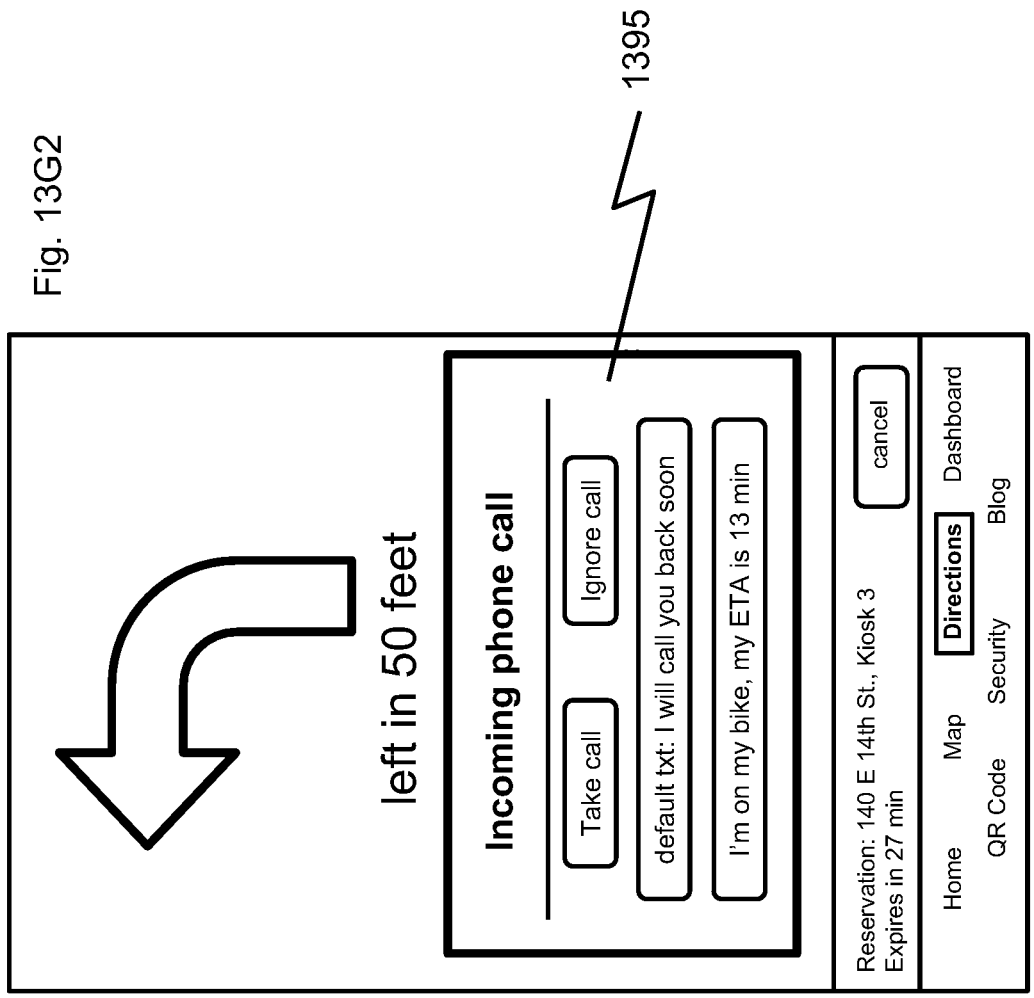

ADVANCED BIKE LOCKING SYSTEM AND METHOD

CROSS REFERENCE TO RELATED APPLICATIONS

This application is a continuation-in-part of U.S. Patent application Ser. No. 13/402,478, filed Feb. 22, 2012, entitled BIKE LOCKING SYSTEM AND METHOD which in turn claims the benefit of U.S. Provisional Patent Application Ser. No. 61/445,284, filed Feb. 22, 2011, entitled BIKE LOCKING STATION, each of which are incorporated by reference herein. In addition, this application claims the benefit of U.S. Provisional Patent Application Ser. No. 62/075,854, filed Nov. 5, 2014, entitled ADVANCED BIKE LOCKING STATION, which is also incorporated by reference herein.

FIELD OF THE INVENTION

The present invention relates generally to the field of securing movable goods in a variety of locations in a metropolitan, campus, or other proximal locations. In particular, the invention refers to an automatic parking station for cycles or bicycles, comprising at least one interactive workstation and a plurality of parking kiosks, in which parking stations are installed in a plurality of sites within a city or a limited geographical area and are electronically tied together through an interactive networked computing system.

BACKGROUND OF THE INVENTION

Statistics show that in many countries the fleet of cycles and bicycles owned by individual persons are relevant figures. To give some examples, in Italy and France the number of cycles and bicycles that are property of individual citizens amounts to more than 20 million in each country, meaning that there is one cycle or bicycle per 3.5 persons. Similar situations can be found, with some variations, in other countries such as Spain, United Kingdom and Germany. In the Netherlands, there is more than one cycle or bicycle per person.

According to the United States Census Bureau, there are over 8,000,000 people who call New York City their home. Of these 8,000,000 people, approximately one half of one percent utilize bicycles as a means of commuting around the city on a regular basis. This percentage is even lower if one counted the numerous commuters and tourists who travel into New York City from the surrounding suburbs and elsewhere to work and play. Based on these figures, the New York City bicycle commuter market has a vast number of bicyclists. There is an increasingly growing wave of New York City's pro-bicyclist policies, including the enactment of recent laws compelling New York City parking garages, commercial buildings and certain residential buildings to designate spaces exclusively for bicycle parking and the installment of miles of newly created bicycle lanes throughout New York City. This immense fleet of privately-owned cycles and bicycles cannot be ignored when an automatic parking station is built for cycles and bicycles.

Automatic parking stations for cycles and bicycles installed in diverse sites within a city and connected via a centralized information system are generally known. For instance, U.S. Patent Application Publication Nos. 2007/0220933 (Gagosz) and US 2007/0239465 (Le Gars) disclose apparatuses for automatically renting bicycles. U.S. Patent Application Publication No. 2010/0245128 (Kanof) discloses an apparatus with unique identification tags for each bicycle that use its parking system.

The above prior art apparatuses suffer from some drawbacks, among which the most relevant one includes the fact that they are either closed systems, which are not suitable to serve a plurality of different users and operators, or provide little or no protection to the bicycle parked at the station.

BRIEF SUMMARY OF THE INVENTION

In one aspect, the present invention is directed a system to secure a movable good, comprising: a plurality of securing units, each securing unit comprising: a first locking mechanism having a locked state and an unlocked state that, when locked, prevents the movable good from being removed; a computing device connected to a data network, wherein the computing device controls the state of the first locking mechanism; and a server computer connected to the data network, comprising a Web server; wherein the server computer loads and runs a computer program into a memory of the server computer that causes the server computer to: receive identifying data from a user; verify an identity of the user based on the identifying data; send a message to the computing device to indicate which securing unit may be used to secure the movable good; and send a message to the computing device to lock the first locking mechanism associated with the indicated securing unit.

BRIEF DESCRIPTION OF THE DRAWINGS

FIG. 4 is a top view diagram of an exemplary bike rack;

FIGS. 5, 5A and 5B are perspective view diagrams of a parking kiosk in a bike rack;

FIGS. 6 and 7 are side view diagrams respectively illustrating a front wheel locking mechanism embodiment of the present invention;

FIGS. 13A, 13A2, 13A3, 13B, 13B2, 13C-G and 13G2 are exemplary screen images generated by an application program on a handheld device.

DETAILED DESCRIPTION OF THE INVENTION

Figure 1:
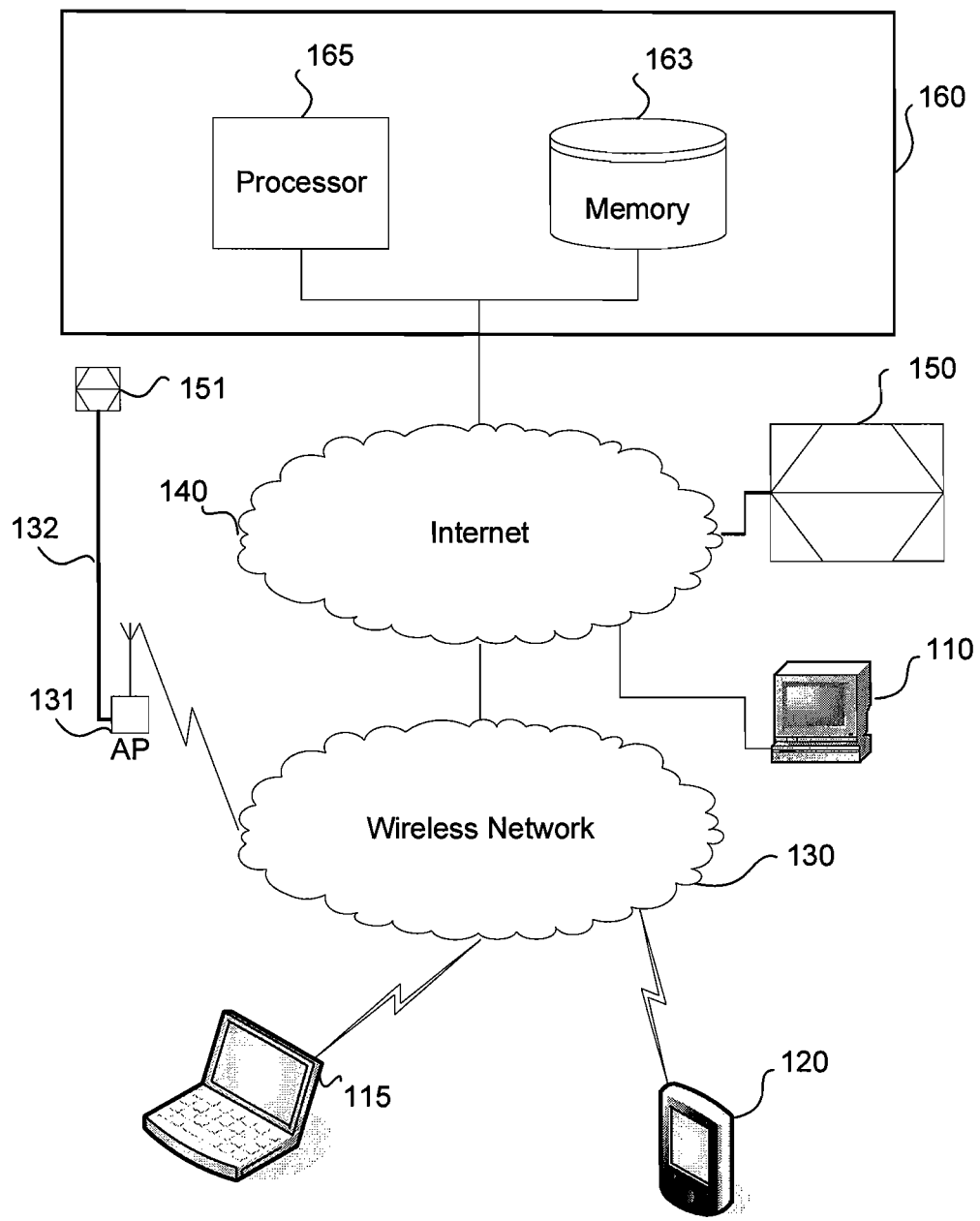
FIG. 1 is a block diagram that illustrates a computer architecture of a preferred embodiment of the present invention.

It is well-known that property, if left unattended, may be subject to vandalism. Especially in New York City, where the sheer number of people provide a challenge to law enforcement to prevent such crimes. While no system is foolproof against the devious nature of the criminal mind, measures can be taken to make such minor and often unprosecuted crimes such as theft and vandalism more difficult to commit The present invention strives to do just that, in the context of providing a safe, economical and convenient means for bicycle parking.

The present invention may be described herein in terms of functional block components, code listings, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, Visual Basic, Python, CGI, PHP or the like, with the various algorithms being implemented with any combination of data structures, objects, processes, routines or other programming elements. The object code created for the computers can preferably be executed by any general purpose computer such as a personal computer having an appropriate operating system such as Windows™ or MAC™ an appropriate browser such as Internet Explorer™ Netscape™ or Safari™.

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims Moreover, no element is essential to the practice of the invention unless specifically described herein as "critical" or "essential."

Data Processing Architecture

FIG. 1 is a block diagram that illustrates a computer architecture of a preferred embodiment of the present invention. In a preferred embodiment, the system and method of the present invention are directed to a computing device at a parking station in communication with a server through the Internet. FIG. 1 discloses a wireless network 130 that provides data communications to mobile devices such as a laptop 115 or handheld cellular device 120 comprising an application program 125, as well as data connectivity to access points 131. As is well-known to those with skill in the art, handheld cellular device 120 may also be any wearable, internet-enabled mobile device, including without limitation, smart watches, glasses, contacts or other human interface computing devices with network connectivity, that can run one or more software application programs 125. Bicycle racks 150 and 151 communicate through either wireless network 130 or the Internet 140 to a central server computer 160. In more detail, with reference to FIG. 1, because Internet 140 can provide a data communication path between various mobile computing platforms, such as a laptop 115 or a PDA or cellular telephone 120 provided through a wireless network 130 to the Internet 140, a user is not limited to a desktop 110 with Internet connectivity to make a reservation, check the status of their bike, or receive messages concerning their bike from the central control website 160. Bike racks 150, 151 operate under the control of server computer 160. As wired Internet connectivity may not be available to each bike rack, a rack 151 may be connected through a local area network 132 and a wireless access point 131.

The server computer 160 comprises a memory 163 and a processor 165 that receives and processes users' reservation requests and maintains the status of each securing unit, known as a parking kiosk, on bicycle racks 150, 151 located throughout the network. In a preferred embodiment, software on desktop computer 110, laptop 155 or handheld device 120 (collectively, the "client device") comprises a Web browser, such as Internet Explorer™, Netscape™, Firefox™, Safari™ or other Web browser, or a web-based application program pre-loaded into memory of the client device or is readily-available for download from the Internet into the memory. Such browsers or applications retrieve Web pages or data from a Web server 160 using the hypertext transfer protocol (HTTP) in response to inputs on a user interface of the client device. Web pages are loaded into memory and then rendered on the display of the client device. In an alternative embodiment, a dedicated, client-based application 125, known as an "app," is installed on client device, wherein such client-based application may use alternate communication protocols from HTTP.

Software on server computer 160 preferably comprises a Web server application. Web server application listens for TCP/IP (transport control protocol/Internet protocol) connections on a well-known port and receives standard HTTP (hyper-text transfer protocol) requests on that port that identifies particular URL (universal resource locator) that indicates Web pages and other information requested, typically by Web browser on the client device. Preferably, a Web server application comprises Apache and a collection of software modules that generate HTML (hypertext markup language) Web pages.

In addition, server computer 160 may include a database stored in memory 163 that includes information related to the physical configuration and status of bicycle parking racks 150, 151, users, directions, locations, time and reservations. A database server application is run by processor 165, is coupled to the database, and provides an interface to the information stored in the database to other application software modules that execute on server computer 160. In a preferred embodiment, the database is a relational database, which includes a number of interrelated tables. Database server application is preferably an SQL (structured query language) server that accepts queries according to an SQL syntax and provides responses to those queries. Database server application can perform stored database procedures comprising complex queries stored in SQL syntax on server computer 160. Such queries may involve multiple fetching processes from more than one table in the tables that comprise the database. Stored database procedures are stored in a file system in the memory 163 of server computer 160.

Although FIG. 1 illustrates only one server computer 160 and a few client devices 110, 115, 120 in communication through networks 130, 140, it should be understood that different numbers of computers may be utilized, at the very least, one client device per user. In one example, the networks 130, 140 may include a plurality of network computers and tens or hundreds of computers, all of which may be interconnected via the networks 130, 140. In alternate embodiments, the functions performed by server computer 160 are split among several server computers, for example, having components of Web server application executed on computers different from a database server application. Furthermore, these servers may be geographically separated and, for example, coupled through Internet 140. In a preferred embodiment, a plurality of client devices are able to simultaneously connect to the server computer 160. The communication links may be provided as a dedicated hardwired link or a wireless link. Although the communication links are illustrated as a single data link, they may comprise multiple data links.

The networked computers, client computer 110 and server computer 160, may be provided in many different geographic locations including a home, different areas of the same city, or they may be located in different states or even countries. Networks 130, 140 may include a plurality of network computers or server computers (not shown), each of which may be operatively interconnected. Where network 140 comprises the Internet, data communication may take place over communication links via an Internet communication protocol (UDP/IP or TCP/IP). Where the network 130 comprises a wireless network, data communication may take place over communication links via a wireless data protocol such as CDMA2000, W-CDMA or other 3G, 4G cellular or wifi technologies. Similarly, where the network communications comprise data, voice and video, communication may take place via an Internet communication protocol or a wireless protocol.

System Operation

The following discussion describes the methods performed by the inventive system. To provide context, the operation of an exemplary, preferred embodiment of a Web-based client/server application and a database server application are described. The description is based on that actions that the computers will perform when the applications are loaded and run.

Web pages served by server computer 160 may comprise at least two types of pages. One type are static Web pages, that are HTML format pages passed on by client/server application direct to a requesting Web browser without modification. The other type are dynamic or active server pages. An active server page includes a procedure specification that, when requested by a Web browser, is executed under the control of client/server application rather than being directly passed to the Web browser. Execution of the procedure specified by an active server page produces HTML formatted information that is passed by client/server application to a Web browser. In a preferred embodiment, active server pages can be generated by a Visual Basic language procedure, CGI scripts, or a procedure written in some other programming or scripting language such as java, perl, python or php, that are executed under the control of a client/server application running on server computer 160.

Active server pages can include references to services provide by a database server application. For instance, a Visual Basic procedure in active server page accesses database server application through an API (application program interface) for the database server application. During execution of the stored procedure, client/server application can access data stored in a database in memory 163. Active server pages can also include references to database procedures stored in memory 163. Each stored database procedure includes one or more SQL statements. Client/server application invokes a stored database procedure during execution of an active server page. Database server application controls the execution of stored database procedure to provide data to client/server application. Together, static Web pages, active server pages, and stored database procedures provide the information to generate Web pages through which a user interacts with the system. Alternatively, a dedicated, client-based application can interact with server application directly, without use of a Web browser.

A database in memory 163 may includes a number of separate tables. For example, a rack configuration table includes information related to the geographic location of each rack, the number of kiosks in each rack, and of those kiosks, which kiosks are occupied, which are available, and which are reserved. Like all tables in a database, the rack configuration table is dynamic in that it can be modified, for example, as more racks are added or removed from the system, more kiosks are added or removed from each rack, or when the status of each kiosk changes.

A database in memory 163 may also include a user table that includes information about the user, such as user authentication information, usage information, addresses, destinations, favorites, billing information or the like.

Figure 2:
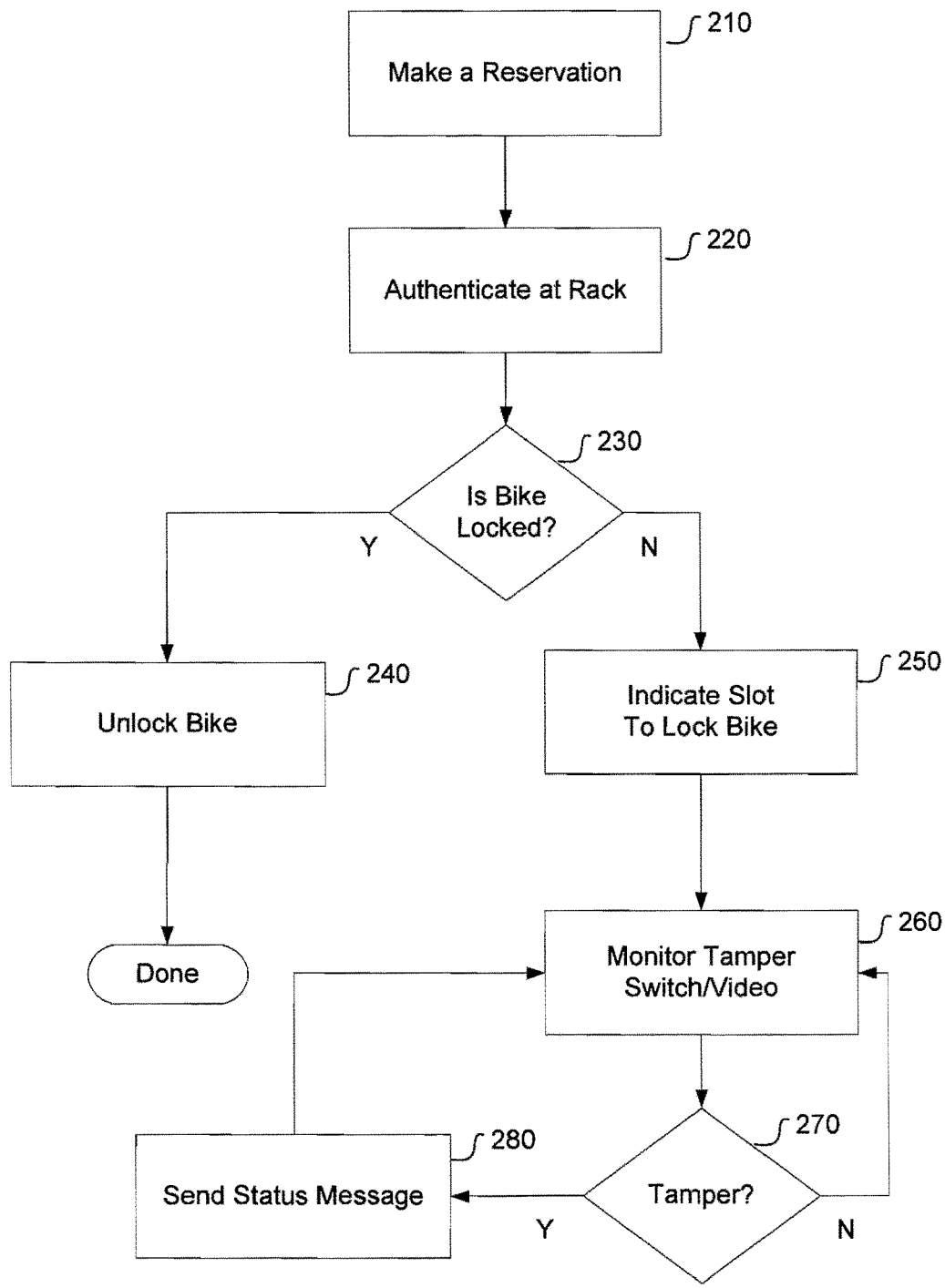
FIG. 2 is a flowchart that illustrates steps taken by a control program implementing a reservation system.

FIG. 2 is a flowchart that illustrates a preferred method for the various steps taken by a client/server application that is loaded from memory 163 and run by processor 165 in server computer 160. As shown in FIG. 2, in step 210 a user makes a reservation by operation of client device 110, 115, 120 to send a message to the server computer 160. Preferably, server computer 160 will reserve an available kiosk in a bike rack 150, 151 chosen by the user, and will hold the reservation for a limited period of time. More preferably, the period of time will be based on the location of the user, the location of the rack, and the expected time for the user to ride to the rack. Server computer 160 may reserve an available kiosk in an alternative bike rack if there are no available kiosks in the bike rack chosen by the user. In a preferred embodiment, server computer 160 will find an available kiosk in the nearest bike rack to the user's ultimate destination, to minimize the amount of walking distance that the user may have to traverse. Server computer 160 may even provide directions to the user to the rack in which a kiosk has been reserved.

In step 220, the user arrives with his bicycle at a rack 150, 151 where a kiosk has been held for him by the reservation. The user then supplies credentials to authenticate his identity at the rack 150, 151. Such authentication can take the form of a credit card swipe, a bar code read, entry of a personal identification number, smart card, QR code, RFID tag, retinal scan, fingerprint scan, facial recognition, near-field communication, remote communication between the user device and the server (a.k.a. remote authentication procedure), DNA or other genetic forms of identification, voice recognition or the like, as is well-known in the art. In an alternative embodiment, the user may arrive at a rack 150, 151 without a reservation, and then authenticate.

In step 230, server computer 160 receives the authentication credentials, verifies the identity of the user, and checks the database stored in memory 163 to see if the user's bike is currently locked in a rack or not. If the bike is locked in a rack, processing proceeds to step 240, where the server computer sends a message to the rack 150, 151, directing the rack to unlock the user's bike.

If the bike is not locked, then processing proceeds to step 250, where server computer 160 commands the rack to indicate which kiosk the user should place his bike. The user then rolls his bike into the rack thereby securely locking the bike in the rack, preferably using one of the mechanisms described below.

In step 260, the rack continually monitors a tamper sensor for the bike, and may also stream video back to server computer 160 continuously, or in the event of a tamper sensor activation. See also FIG. 12, below.

In step 270, if a tamper event has occurred, the rack 150, 151 will notify server computer 160 of the event, which in turn may send a warning message to the corresponding user, as shown in step 280. The user may then monitor the video feed via the website provided by server computer 160.

Software on Media

Figure 3:
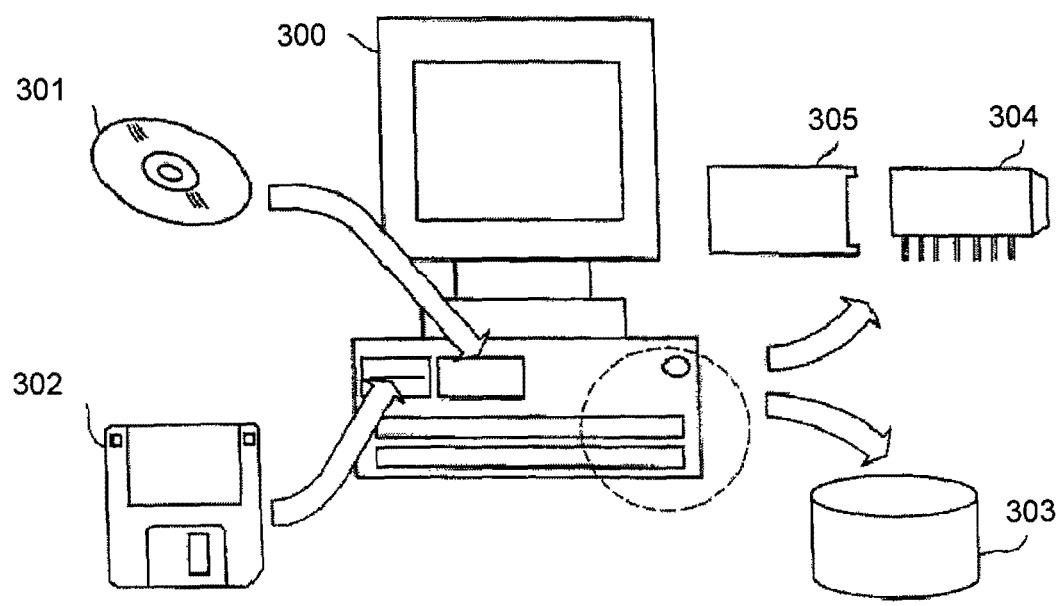
FIG. 3 is a block diagram that illustrates various computer-readable media used to store the control program for a control website.

In the specification, the term "media" means any computer-readable medium that can record data therein. FIG. 3 illustrates examples of recordable computer-readable media.

The term "media" includes, for instance, a disk shaped media for 301 such as CD-ROM (compact disc-read only memory), magneto optical disc or MO, digital video disc-read only memory or DVD-ROM, digital video disc-random access memory or DVD-RAM, a floppy disc 302, a memory chip 304 such as random access memory or RAM, read only memory or ROM, erasable programmable read only memory or E-PROM, electrically erasable programmable read only memory or EEPROM, a rewritable card-type read only memory 305 such as a smart card, a magnetic tape, a non-volatile memory, also known as a hard disc 303, and any other suitable means for storing a program therein.

A recording media storing a program for accomplishing the above mentioned apparatus may be accomplished by programming functions of the above mentioned apparatuses with a programming language readable by a computer 300 or processor, and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer 300, any suitable device for performing computations in accordance with a computer program may be used. Examples of such devices include a server, a personal computer, a laptop computer, a nettop computer, a microprocessor, a programmable logic device, or an application specific integrated circuit.

Hardware Architecture

FIG. 4 is a top view diagram of an exemplary bike rack. With reference to FIG. 4, a bike rack 400 comprises a plurality of securing units, hereinafter referred to as parking kiosks 410, each kiosk comprising a computing device 420 for communicating with server computer 160, receiving authentication data and supplying signals to lock/unlock bicycle parking, and to provide indications 430 as to the status of the parking. Alternatively, the bike rack 400 may comprise a single computing device 420 servicing all kiosk parking spaces. A camera 440 may also be provided that is communicatively coupled to computing device 420. Bike rack 400 may contain a URL or a bar code providing Web navigation for a user of a handheld client device to interact with the server computer 160, so that a user interface to computing device 420 will not be required. Computing device 420 may interface with a card reading device for payment by credit card, debit card, smart card or a discount card, bar code reader, or the like well-known in the art to allow the system to provide user access and payment for parking privately owned bicycles, or rental bicycles parked in the kiosks for that purpose. Discount cards may include cards provided by local merchants as a perk to their customers, similar to validated automobile parking.

The user will be able to view streaming, up-to-the-second video of their secure bicycle through protected camera 440 that is integrated into the bike rack 400. Access to such streaming video will only be permitted to users who currently have their bike parked in the corresponding bike rack. In a preferred embodiment, server computer 160 may provide an application for download that will allow users to record and store images of parked bicycles in their client device 110, 115, 120.

FIG. 5 is a perspective view diagram of a parking kiosk 500 in a bike rack 400. Illustrated in FIG. 5 are computing device screen 510, locking mechanism comprising a cable rope 520 and cable rope latch 525, shroud 530, track 540, a tire bumper 550 and a tamper sensor 560. Computing device 510 includes a processor (not shown), wireless or wired network interface (not shown), a visual display screen 515, a camera 517, a sound emitting device 518 and may also include user interface devices 519, such as a fingerprint scanner, buttons, near-field communications, etc., to enable user inputs, including without limitation identifying a person as is well-known in the art. Upon startup and preferably periodically thereafter, computing device 510 conducts a self-inspection to check operation of its locking mechanisms, locking ability, locking state, etc. Visual display screen 515 may provide indications, such as: (i) a green light indicating that such parking kiosk is available for parking, (ii) a yellow light indicating that the parking kiosk is reserved, (iii) a flashing yellow light indicating that a given reservation is set to expire in a short time period, and (iv) a red light indicating that a bicycle is currently secured in that kiosk. See further, FIGS. 12 and 12A-E below.

Figure 5B:
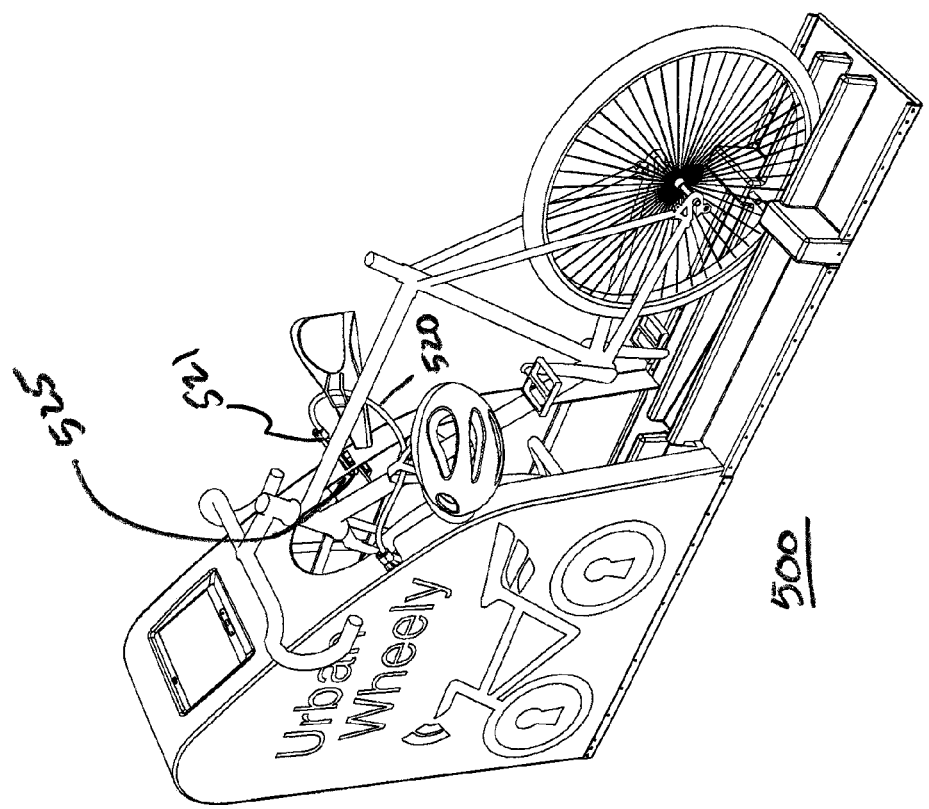

FIGS. 5A and 5B are perspective view diagrams of parking kiosk 500 illustrating cable rope locking mechanism in more detail. As illustrated in FIG. 5A, cable rope 520 has two ends, a loose end 521 and an end fastened to kiosk 500. Cable rope latch 525 provides a latching mechanism to secure parts that can be separated from the user's bike, such as the bicycle seat or the user's helmet. For example, as illustrated in FIG. 5B, a user would thread cable rope 520 through the seat and helmet, and then attached the loose end of cable rope 520 to cable rope latch 525. Once the bicycle is locked in the parking kiosk 500, cable rope latch 525 will prevent removal of the loose end of cable rope 520. When the user unlocks their bicycle from parking kiosk 500, cable rope latch 525 will release the loose end of cable rope 520.

As shown in FIGS. 5, 5A and 5B, shroud 530 protects the front wheel of the bicycle, as described below. Preferably, devices are secured to kiosk 500 in such a manner to prevent tampering. For example, wires and computer hardware will be secured to kiosk such that removal will be inaccessible without first removing shroud 530, and shroud 530 will be attached to kiosk with tamper-proof fasteners, etc.

Figure 5C:
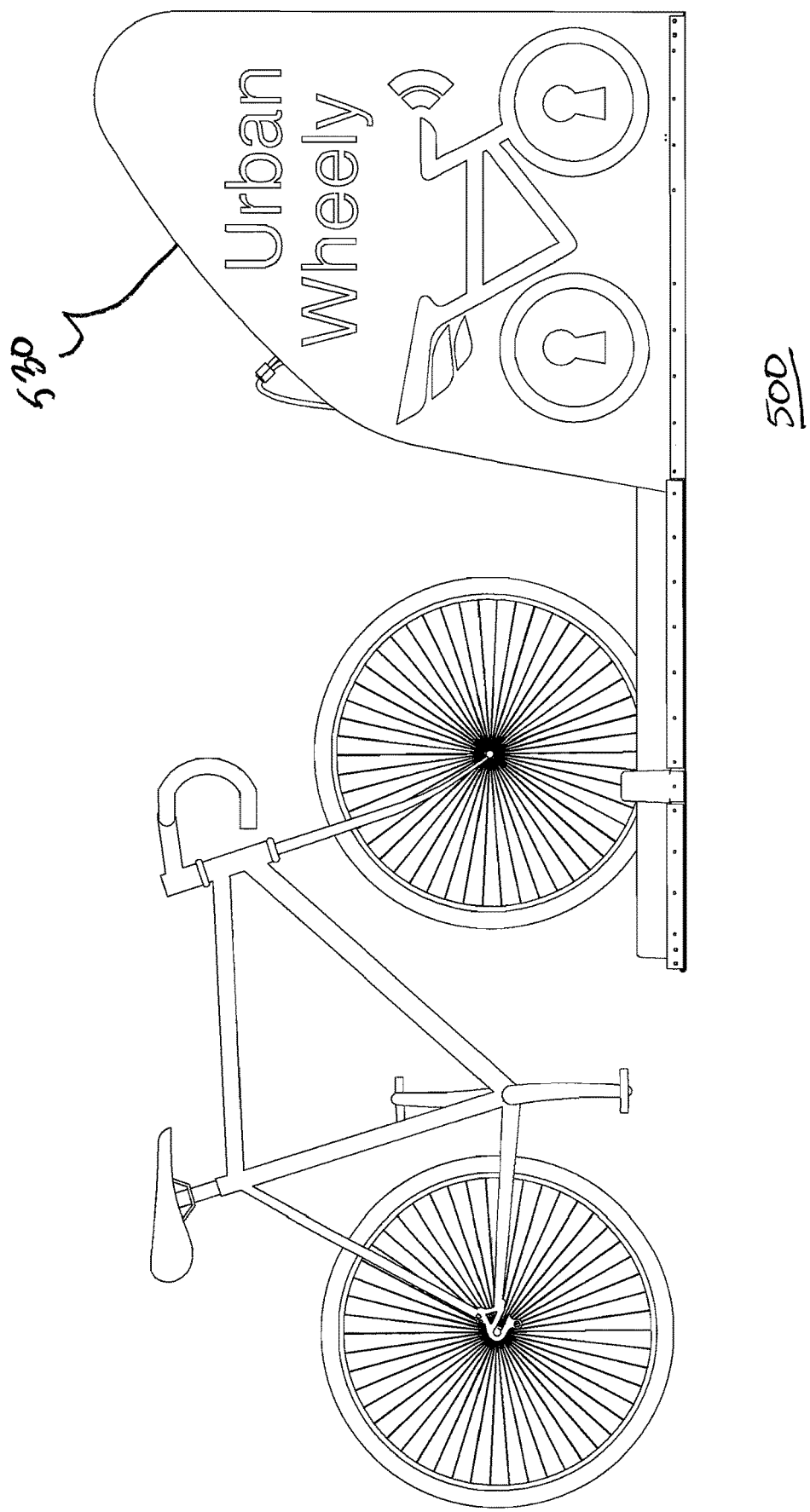
FIG. 5C is a side view diagram of parking kiosk 500.

FIG. 5C is a side view diagram of parking kiosk 500, illustrating shroud 530. As shown in FIG. 5C, the surface area of shroud 530 may be suitable for the placement of advertisements. In the particular embodiment illustrated in FIG. 5C, the URBAN WHEELY™ logo represents an advertisement placed on the side of the kiosk 500.

Returning to FIG. 5, track 540 helps the user guide the bicycle into the proper position to park and secure the bicycle. Tire bumper 550 preferably comprises two protruding angled pads that are positioned opposite each other on either side of the front tire at a height just below a given tire's axis point in such a manner that supports the front tire from leaning too far to the left or right and to prevent an individual from releasing a front tire's quick release lever while a bicycle is secured inside the shroud.

As an additional security measure, each kiosk is equipped with an anti-theft tamper sensor 560 that provides a signal to the computing device 510. Tamper sensor 560 may be visible light, infrared, ultrasonic, pressure, contact, accelerometer, gps, or any other device or mechanism well-known in the art to detect movement, attempted forced removal or component theft of the bicycle. Computing device 510 may, in turn, (i) instantaneously notify a garage attendant, doorman or passerby located at the site of the triggered anti-theft sensor of any unauthorized movement of a user's bicycle from its parking kiosk; (ii) send a notification via email to that certain user, notifying him or her that their bicycle has been tampered with; (iii) sound an audible alarm; or (iv) send a message to law enforcement authorities directly or via the URBAN WHEELY™ staff. Tamper sensor 560 may be so displaced as to be sensitive to movements occurring in a volume around a parking kiosk that is suitable to fully include one bicycle. Computing device 510 may automatically activate or deactivate any notifications based on parking activity in an adjacent kiosk. Preferably, the user will be able to view streaming, up-to-the-second video of their secure bicycle through protected camera 517. Preferably, access to such streaming video will only be permitted to users who currently have their bike parked in the corresponding bike rack. Additionally, if tampering is detected, camera 517 can record pictures and video, and computing device 510 will notify user, preferably by SMS, email, or in an "app," and permit the user to view images in real time taken by camera 517 or provide recordings thereof. Sound emitting device 518 may provide an audible alarm when tampering is detected.

Figure 7:
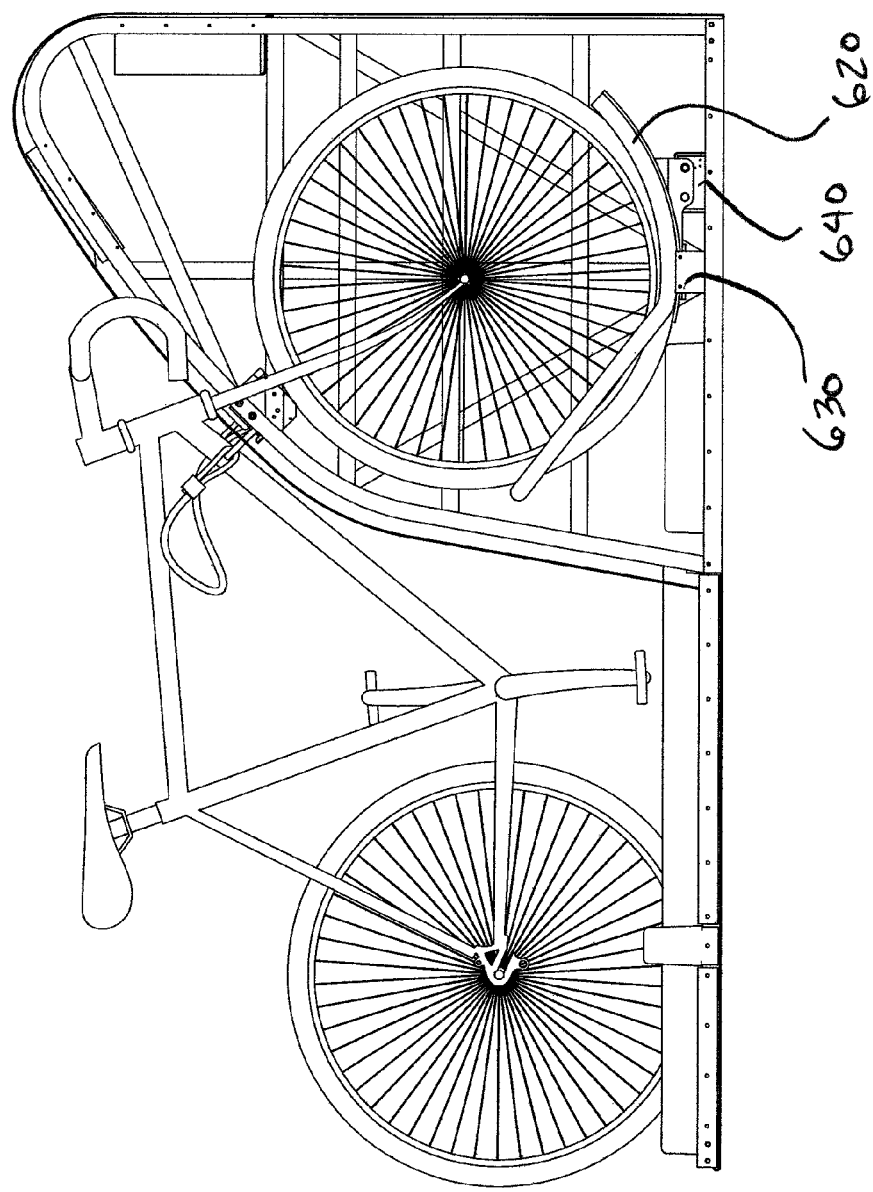

FIG. 6 is a side view diagram illustrating a securing mechanism for a front wheel of a bicycle. FIG. 6 discloses a track 610, a boomerang-shaped lever 620, that pivots on a toggle bolt or shaft 630, and a releasable latching mechanism 640. As shown in FIG. 6, the user can push their bicycle along track 610 such that the front wheel comes in contact with the top of boomerang 620 so that boomerang 620 pivots upward around shaft 630. As the wheel is moved along the track, the back of boomerang 620 is designed to capture the front tire of the bike, thereby preventing the bike from being removed from shroud 520. When the front wheel is fully inserted, the front of boomerang 620 will engage latching mechanism 640, thereby preventing boomerang 620 from pivoting, as illustrated in side view diagram, FIG. 7. Boomerang 620, in cooperation with shroud 530, encapsulates the front tire and forks of the user's bike. When the bike is unlocked, latching mechanism 640 releases boomerang 620 to permit the user to withdraw his bike from shroud 530 along track 610.

Figure 8:
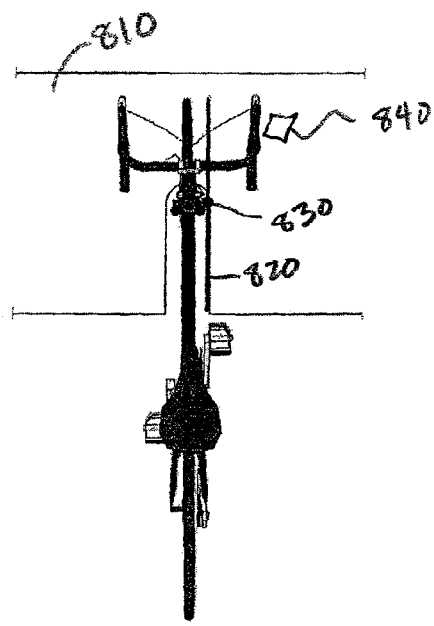
FIGS. 8 and 9 are top view diagrams illustrating an alternative front wheel locking mechanism embodiment of the present invention.
Figure 9:
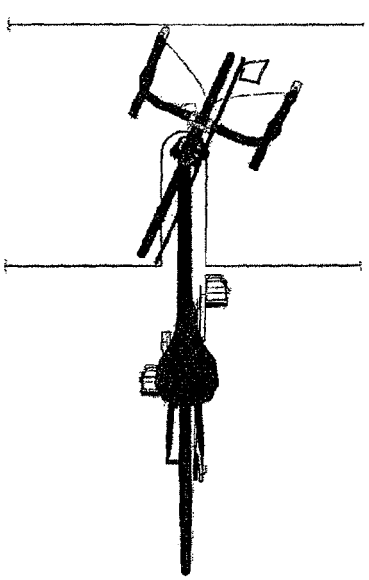

FIGS. 8 and 9 are top view diagrams illustrating another locking mechanism embodiment of the present invention. FIG. 8 illustrates a shroud 810, blocking plate 820, pivot 830, and latch 840. Blocking plate 820 is attached to pivot 830, and rotates within shroud 810 about the axis of pivot 830. Latch 840 comprises a magnetic lock or other electromechanically release mechanism that connects to blocking plate 820, and securely prevents blocking plate from counter-rotation until unlocked.

In operation, the user pushes their bicycle on a track such as described above, allowing the front wheel to enter shroud 810. Once the front tire of the bicycle is fully inserted into shroud 810, the user will turn the wheel of the bicycle, which will rotate blocking plate 820. Latch 840 latches onto blocking plate 820, thereby encapsulating front tire within the shroud and preventing rotation of the front wheel from the locked position, as illustrated in FIG. 9.

Figure 10:
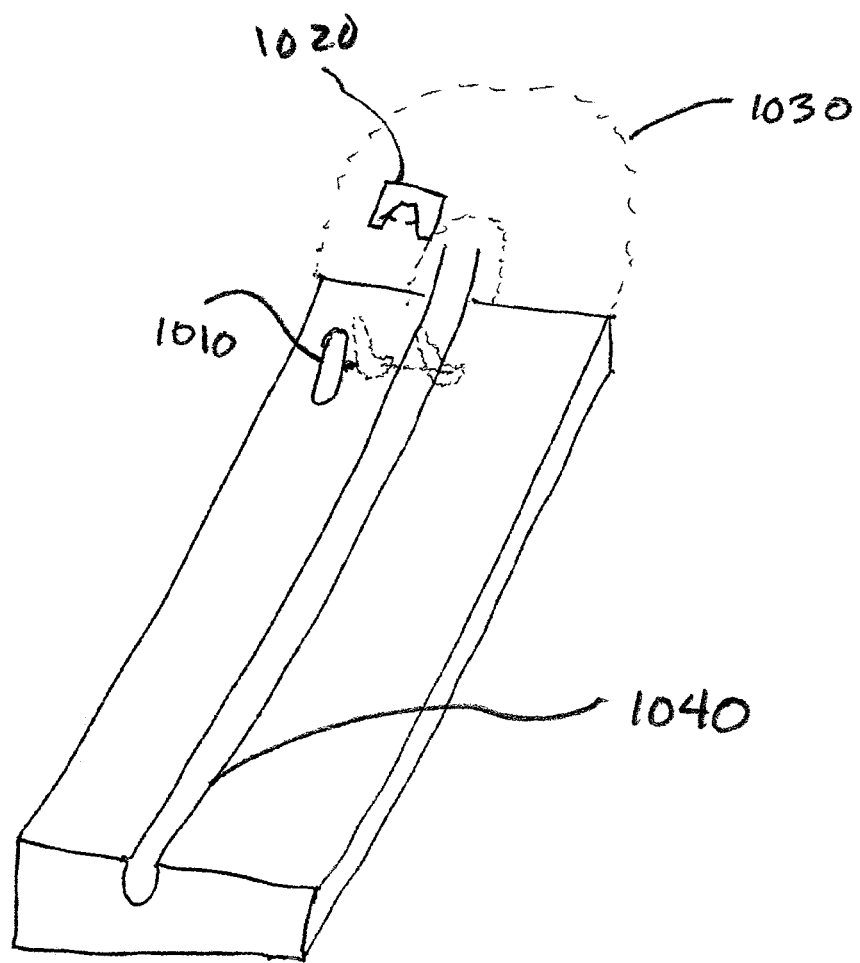
FIG. 10 illustrates another exemplary embodiment of a front wheel locking mechanism for the present invention.

FIG. 10 illustrates another exemplary embodiment of a front wheel locking mechanism for the present invention, comprising a ring 1010 and a latching mechanism 1020. Ring 1010 is preferably mechanically secured at a predetermined height above the ground to the front fork of a bicycle. Such securing can be accomplished with materials commonly known in the art, such as a pipe clamp and a fastener, welding, or the like. Latching mechanism 1020, located within shroud 1030, engages ring 1010 the user guides bicycle along track 1040, and prevents the removal of the bicycle until latching mechanism 1020 is unlocked, as described above.

Figure 11:
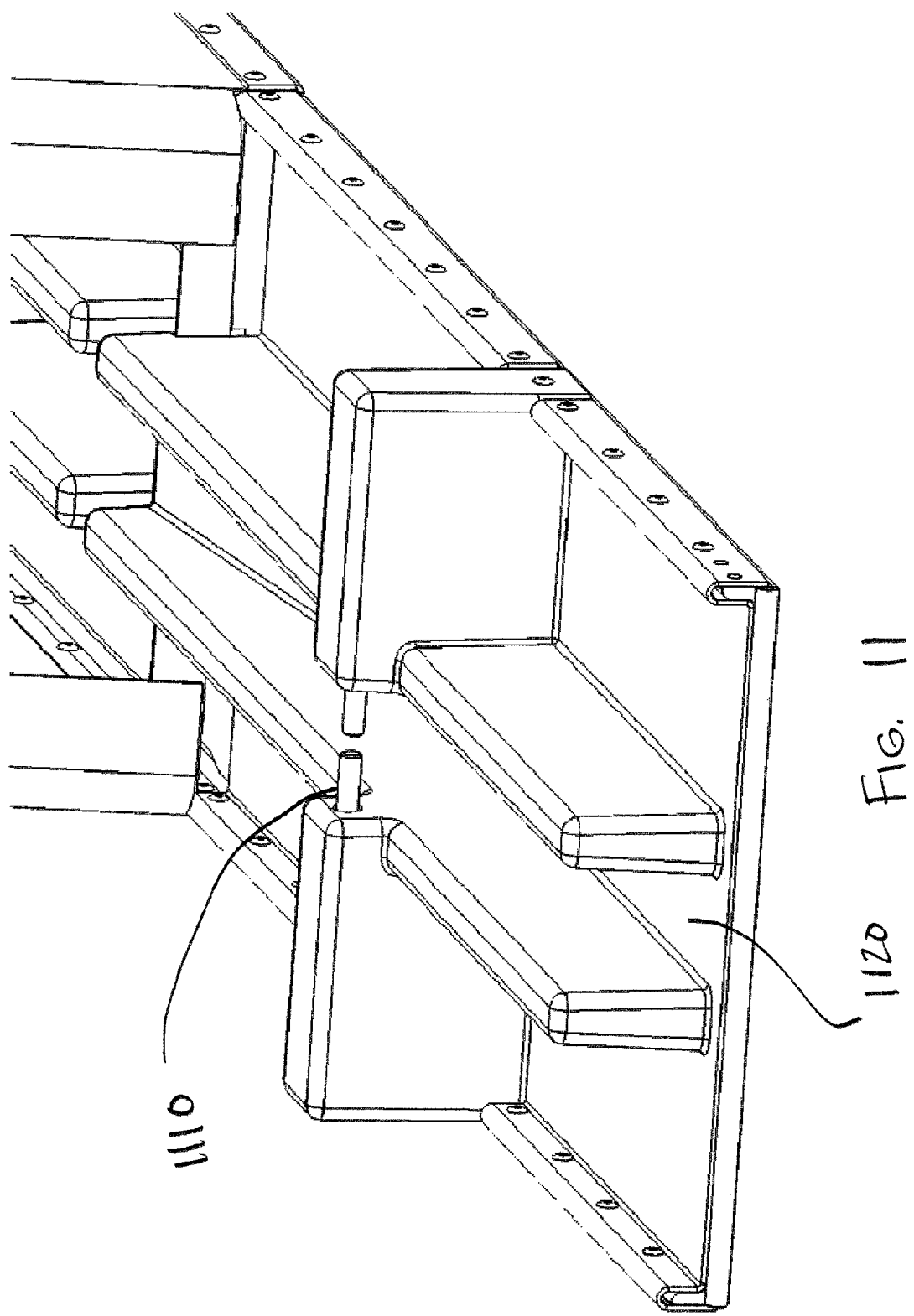
FIG. 11 illustrates an exemplary embodiment of a rear wheel locking mechanism of the present invention.

FIG. 11 illustrates an exemplary embodiment of a rear wheel locking mechanism for the present invention. FIG. 11 illustrates a plurality of pins 1110 and a track 1120. Track 1120 is similar to track 610 described above. As shown in a preferred embodiment illustrated in FIG. 11, a pair of opposing pins 1110 are configured to secure a rear wheel of a bicycle. When a user engages the front wheel locking mechanism of the present invention, pins 1110 are advanced to prevent the rear wheel from being removed from track 1120. In a preferred embodiment, opposing pins 1110 are solenoid operated. When the user unlocks the bicycle, pins 1110 retract, thereby releasing the rear wheel.

In an alternative embodiment, boomerang 620 may be replaced by pins, similar to opposing pins 1110, as described above.

Figure 12:
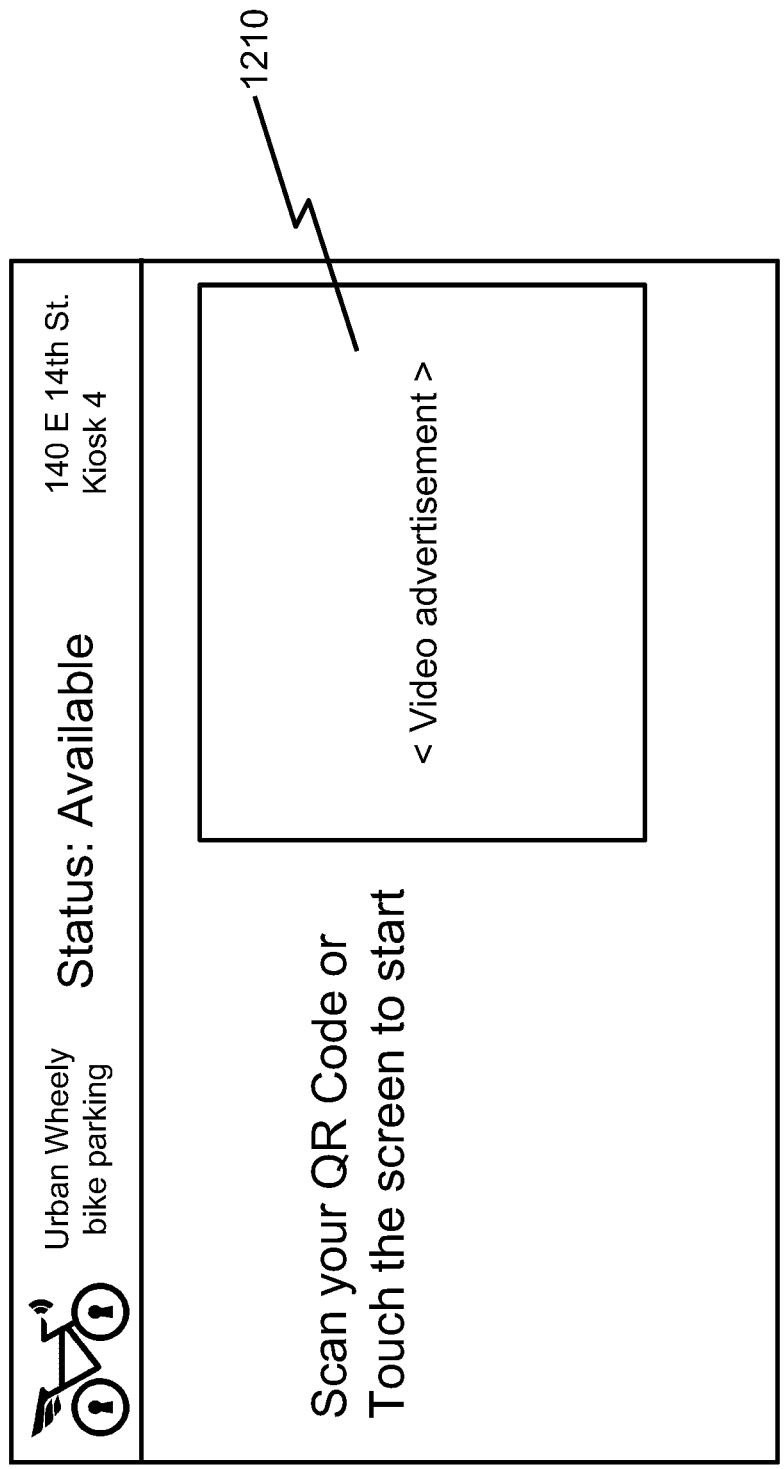
FIGS. 12 and 12A-E are exemplary screen images of visual display screens on a parking kiosk.

FIGS. 12 and 12A-E are exemplary screen images of visual display screens on a parking kiosk. Information is preferably delivered between a parking kiosk and server by encrypted communications. In addition, the features and content on Kiosk screen and smartphone app are preferably interchangeable. See FIGS. 13 below for description of smartphone app. FIG. 12 illustrates a home screen for an available parking kiosk. FIG. 12 also illustrates stationary and/or video images 1210 of advertisements and announcements.

Figure 12A:
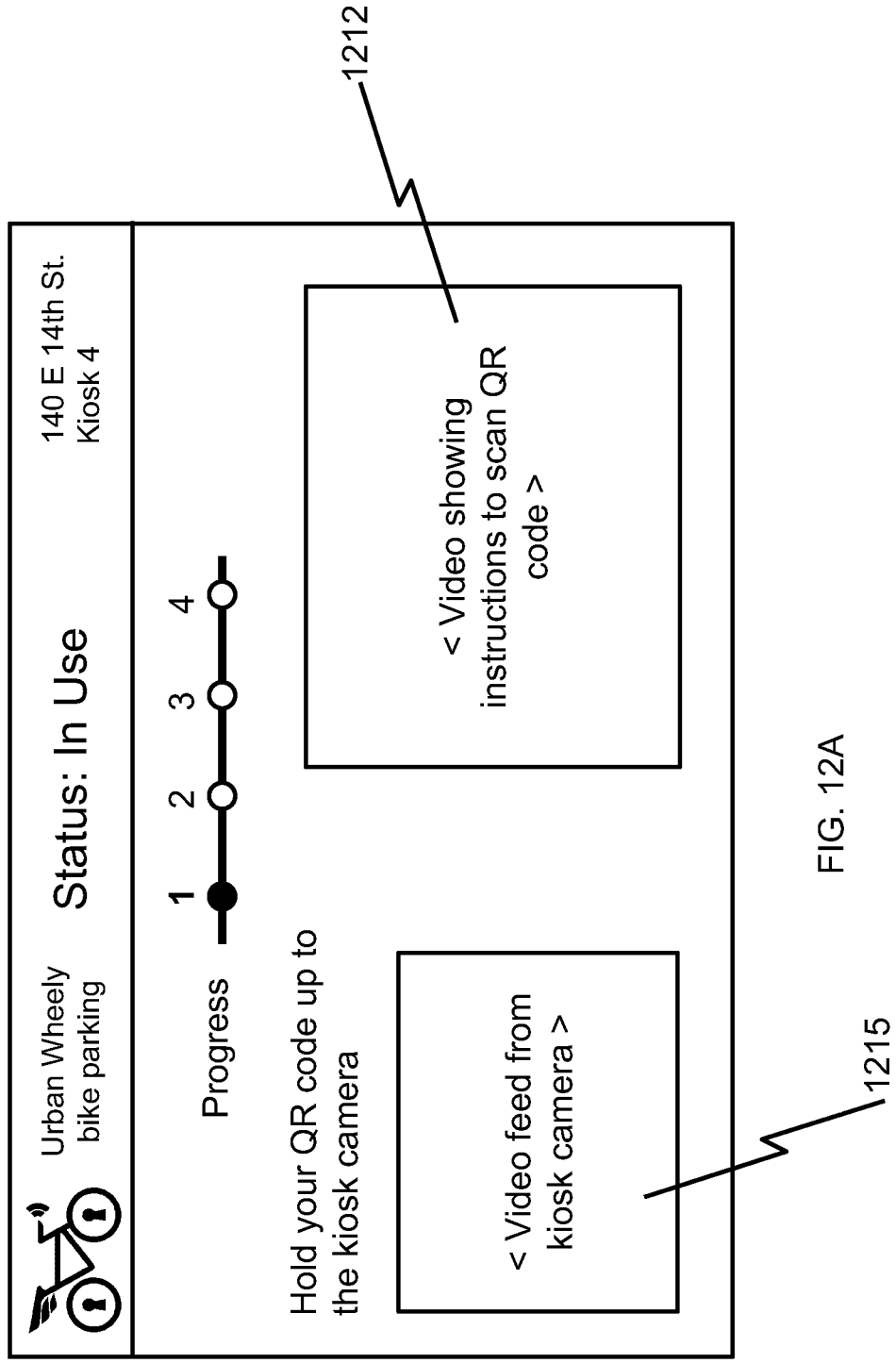

FIG. 12A illustrates a screen 1212 with parking information, providing user instructions for identification of the user. FIG. 12A further provides a video feed 1215 from the kiosk camera.

Figure 12B:
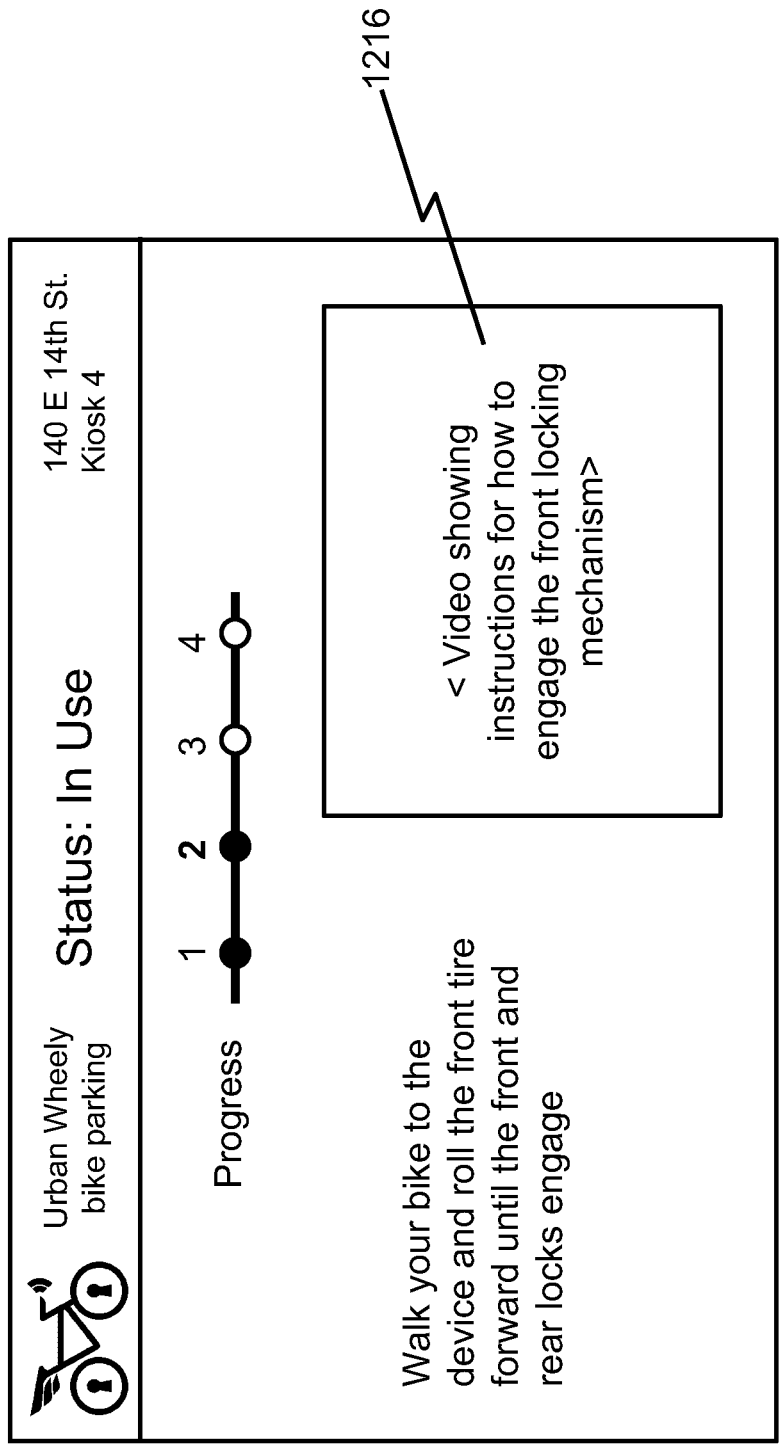

FIG. 12B illustrates video instructions 1216 provided to the user to park the bike after authenticating their identity.

Figure 12C:
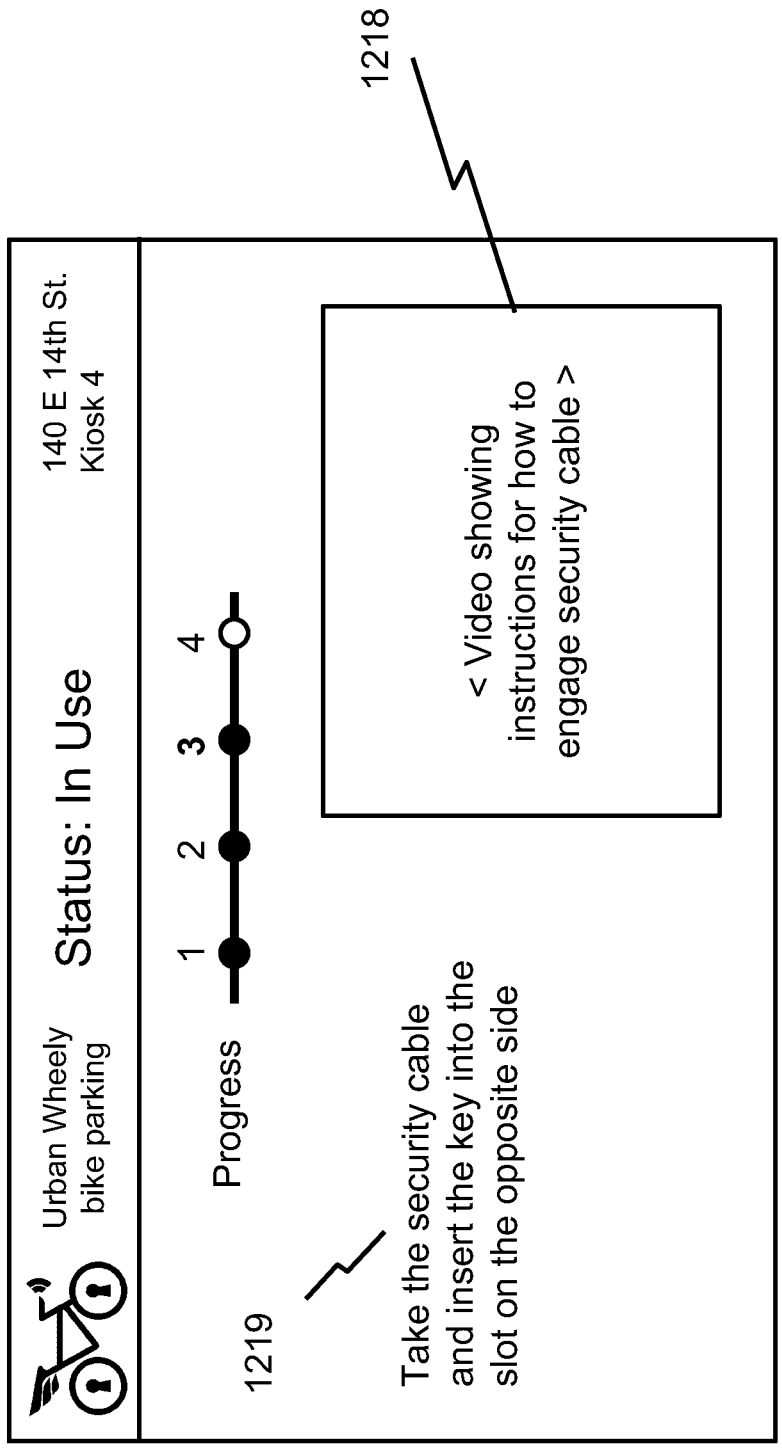

FIG. 12C illustrates video 1218 and written 1219 instructions provided to the user to complete their parking, including use of cable rope to secure loose items and the bicycle frame.

Figure 12D:
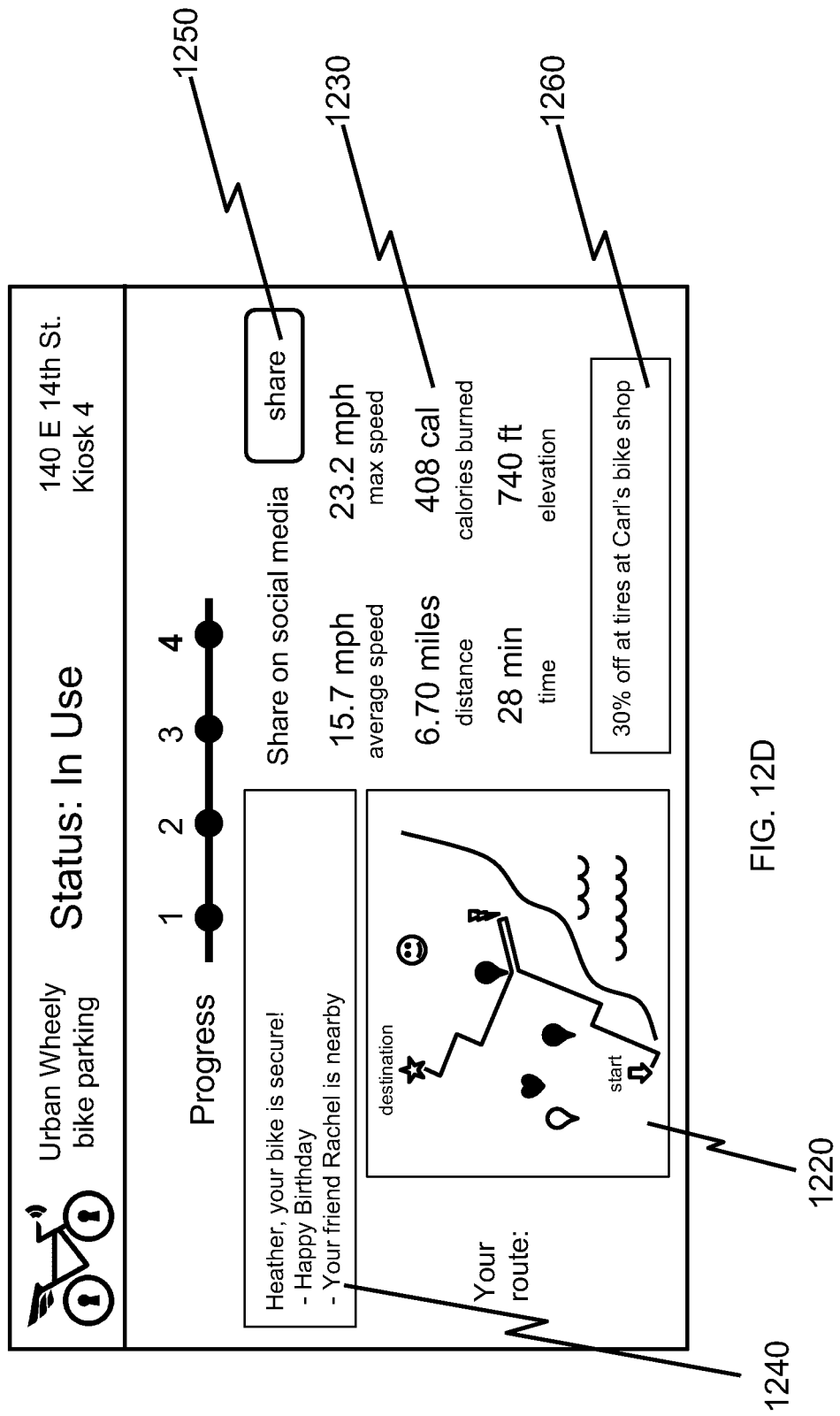

FIG. 12D illustrates a screen 1220 showing route and location information, including a map highlighting a users route from their origin point to their destination. FIG. 12D also illustrates a table 1230 indicating speed, distance and calories burned. FIG. 12D further illustrates a screen 1240 indicating successful parking by the user, and also illustrates a user's personal updates. FIG. 12D further illustrates a control button 1250 providing the user with the ability to share information on social media. Finally FIG. 12D illustrates a portion of the screen 1260 that provides personalized, geo-targeted advertisements to a given user based on location, user profile, past searches, past trips, current route planning and kiosks used. Preferably, the features and content shown on FIG. 12D could be interchangeable with the handheld device application (see FIGS. 13 below).

Figure 12E:
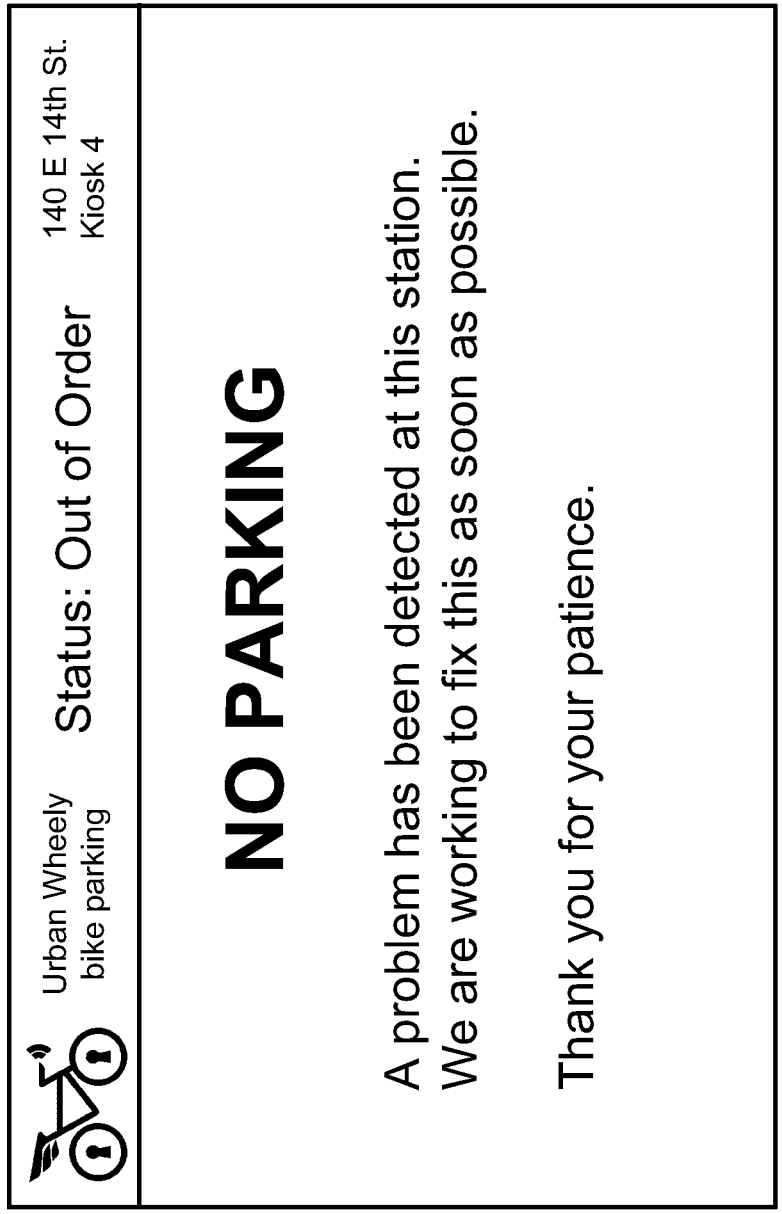

FIG. 12E illustrates a screen display 1299 that appears when kiosk detects trouble.

Application Program

FIGS. 13A-G are exemplary screen images generated by an application program (an "app") on a handheld device. Information is delivered to/from the app and server by encrypted communications.

Advertisements to the app are geo-targeted, based on location, user profile, past searches, past trips, current route planning and kiosks used. An in-app advertising system may be implemented with ads targeted to users based on any data that Urban Wheely may collect about its users, including but not limited to their member profile, past searches, past interactions with advertisements, past redemption of company issued coupons, past trips, current location, current speed, current distance to destination, current distance to bidder's specified address, current task list, current route planning, kiosks used, and interactions with other users through the app.

Media buyers can use the advertising system that will enable potential advertisers to search for attractive user profiles or specific types of user profiles that align with a media buyer's specific marketing criteria. Media buyers can use the advertising sales system to pay for advertising interactions, such as an advertising impression, advertisement per click, or fee for user purchases. This advertising sales system will preferably enable media buyers to purchase an advertising interaction for a fixed price or percentage of sales price. This advertising sales system will preferably enable media buyers to bid on interactions within an auction format, such as a second best bid auction, for a fixed price or percentage of sales price. Auctions can include both real-time auctions or auctions held over longer time frames. In a preferred embodiment, the advertising auction uses geospatial locations and routes, while protecting user privacy.

For example, media buyers may specify a set of locations for selling services. The system will provide media buyers what is the client's shortest distance to any of the locations set by the media buyer, but will not reveal where the user is located. If the user is traveling on a planned route, media buyers will be provided with the shortest distance the user will be to any of the locations specified by the media buyer. In addition, media buyers will be provided with a time estimate when the user will be nearest to the shortest distance location. As a user privacy protection measure, the system will jitter the user's location by a certain, predetermined distance, preferably 0.05 miles, and further may be rounded up to the nearest 0.1 miles when reporting information to the media buyer. Similarly the system may jitter advance the estimated time of arrival, preferably by up to as much as 10 minutes.

Users can use the advertising system to purchase a specific item within the app or using a coupon. Users can directly purchase advertised items, or for example, Urban Wheely can act as an intermediary that makes payment on behalf of the user, and settles the transaction with the advertiser.

FIG. 13A illustrates a screen diagram with a portion 1310 that indicates which stations have free kiosks. FIG. 13A includes an illustration of a portion 1312 that indicates a user's favorite kiosks based on user history and/or user settings. FIG. 13A also includes an illustration of a portion 1314 that indicates specific events occurring near the user's current location. FIG. 13A further includes an illustration of a portion 1317 including seven button navigation to other screens. FIG. 13A also includes an illustration of a portion

1316 that indicates friend updates, including recent activities completed and upcoming personal events, and a portion 1318 indicating location and time of any pending kiosk reservation. Finally, FIG. 13A illustrates a portion of the app screen 1320 that provides route planning, recommended weather gear and weather conditions.

FIG. 13A2 illustrates a screen diagram for the app that provides the user with the ability to set automatic SMS text responses for when the user is riding. A portion of the screen 1327 is a control button for setting an SMS text message that will automatically be sent when the user is within a predesignated distance from a predesignated geographical destination. A control button 1328 provides the user with the ability to set an automated SMS response text while they are riding to their destination. A further control button 1329 provides the user with the ability to set their favorite kiosk station based on user history and/or user settings. See also ref. No. 1312, FIG. 13A.

FIG. 13A3 illustrates a screen diagram for the app that enables the user to set their Smart Route settings. The Smart Route algorithm will preferably generate a recommended route for the user based on a number of parameters, including without limitation, a user's past bicycle route, current route, or time weighted history of user's geospatial location, as stored in user profile, as well as the user's current task list 1324 and slider bar settings 1326. FIG. 13A3 illustrates a portion of the screen for entry of the current task list 1324 to perform certain destination-related tasks, such as purchasing an item at a brick and mortar store, or performing an activity at a specific location. FIG. 13A3 also illustrates a slider bar 1326 that lets a user choose the weighting of parameters that are most important to the user between shortest route or highest quality of matches.

In more detail of a preferred embodiment, the application program would provide the user with slider to select a Smart Route value between 0 and 1.0, where 0 represents a preference for routes that take the shortest time to travel disregarding any additional goals, and 1.0 represents a preference for reaching all goals with a lower priority on the route's total time.

Based on the users task list, past interactions with advertisements, past searches, the app will come up with a list of tasks. After calculating the shortest route disregarding all tasks the system will search for possible destinations that match task terms. Each possible destination is assigned to one task. As an example a task might be "buy a book" and a possible destination might be a local book store. Each possible destination is assigned a goal value, as where very desirable goals have a large negative value and less desirable goals have a small negative value. The desirability of the goal is then computed by multiplying the priority of the task, how well the possible destination matches the task, as well as the Smart Route selection from 0.0 to 1.0 and negating that value.

Given N tasks enumerated as $t\_0, t\_1, \ldots t\_N$, for each task $t\_i$ there are $t\_i\_M$ possible destinations $(t\_i\_0, t\_i\_1, \ldots t\_i\_M)$. The system computes the shortest route for any combination of destinations that has no more than one destination associated with a given task. The total number of routes calculated in this case would be $((t\_0\_M+1)*(t\_1\_M+1) \ldots (t\_N\_M+1))$. For each route the total time taken is divided by the time required for the fastest route with zero additional destinations, and then the negative goal values are summed for each destination reached. As an example, a route that goes by the local bookstore is 20% longer than the route that goes straight to the destination, but the priority of the "buying a book" task as well as the match quality between the local book store and the task are high (both 0.7). If the user selected a Smart Route setting to 0.5, then the route that includes the book store would have cost 1.2−0.7*0.7*0.5=0.955, whereas the route that goes straight to the end goal without any additional task destinations would have cost 1.0. In this case the value of going to the book store makes the route to the book store less than the route that goes straight to the end destination. If the user changes the Smart Route setting to 0.1, then the route to the book store has cost 1.149 and becomes more expensive than the cost that skips the book store.

As an optimization, some subset of all possible routes are searched and then used as initial results to find the optimal route. Searching a subspace after initial sampling can be done with techniques such as gradient descent, genetic algorithms or simulated annealing, as is well known in the art.

In addition, the system will locate the nearest parking kiosk to each of the vendors that are on the user's Smart Route. For example, if a user wants to purchase milk, flowers and a haircut on the way home from work, not only will the app calculate the Smart Route, time and vendors for the user, but it will also determine where, and preferably reserve, parking kiosks for their bike to make it easier for them to complete their tasks while traveling by bike.

Figure 13B:
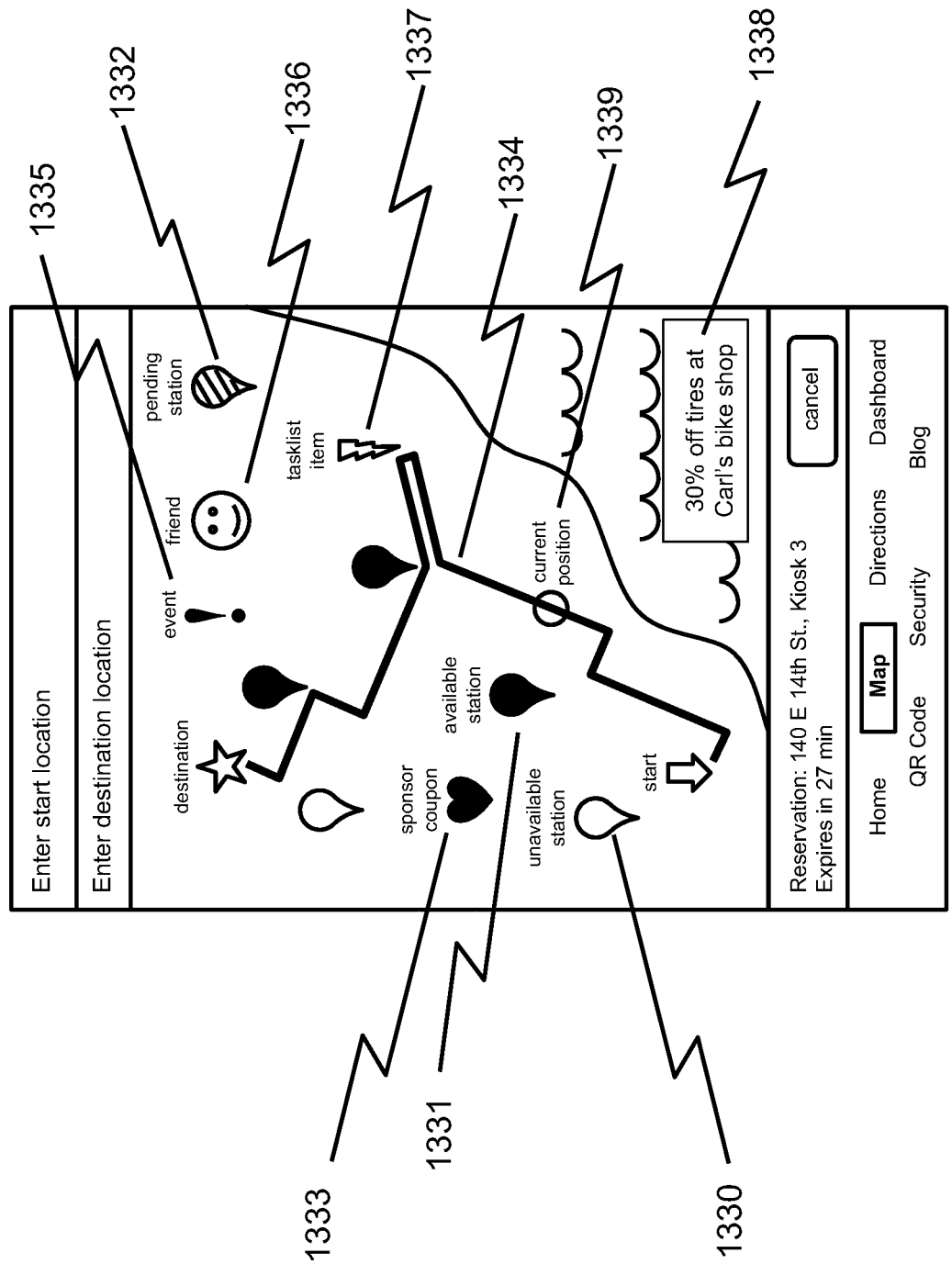

FIG. 13B illustrates a home screen that provides general notices to the user through a map that updates based on communication with server 160. The map tells a user what kiosks are unavailable 1330 and which kiosks are available 1331, and which kiosks have pending reservations 1332 that may become available. For example, a green icon could indicate an available kiosk, a red icon could indicate an unavailable kiosk and a yellow icon could indicate a reserved kiosk which may become available shortly if the reservation holder doesn't dock their bicycle within a predetermined amount of time. The map also indicates a sponsor coupon or advertisement icon 1333 that will be offered to the user based on their geospatial location, among other criteria. The map also indicates an optimal bike route from a starting point to a destination 1334, illustrates specific events occurring nearby 1335, shows nearby friended users 1336, provides an icon for user access to the current task list items 1337, provides advertisements to the user 1338 and shows a user's geographical location 1339.

When a user selects a kiosk icon 1330, 1331 or 1332 from the home screen, the app provides the user with a pop up screen, illustrated in FIG. 13B2. As shown in FIG. 13B2, the pop-up screen 1340 that provides information about the selected kiosk and allows the user to make or cancel reservations for the kiosks.

FIG. 13C provides a QR code screen 1344 that provides user identification for a kiosk reader. As shown on FIG. 13C, a screen button 1346 provides the user with the ability for locking, unlocking, or remote unlocking. In addition, the app provides a user with a kiosk beep (parking locator) button 1348, so that the kiosk where the user's bike is parked will audibly notify the user where their bike is parked, thus providing easy locating among massive multitudes of bikes that an esteemed URBAN WHEELY™ empire can service.

Figure 13D:
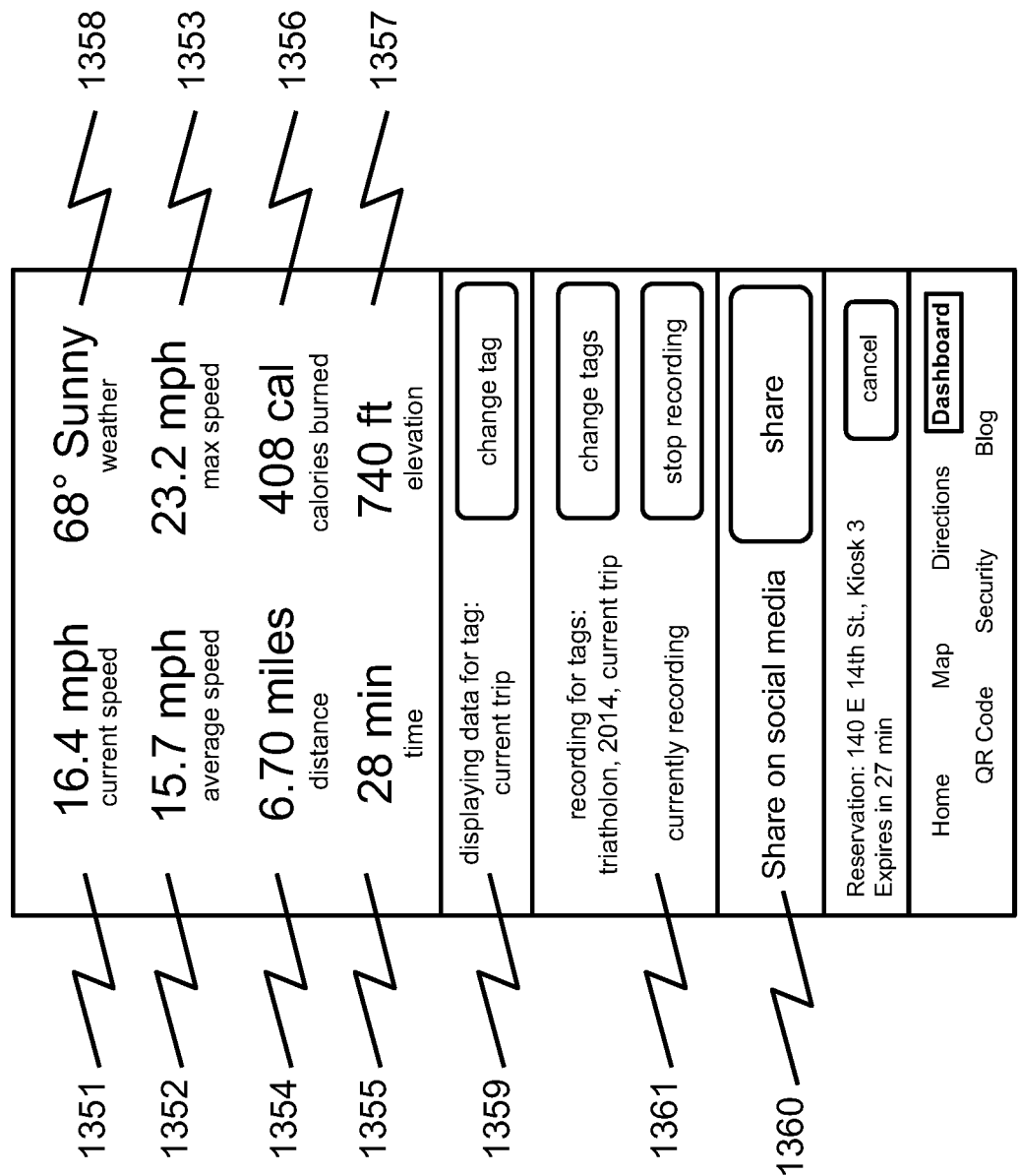

FIG. 13D illustrates a dashboard screen for the app that the user will choose when riding. As shown in the exemplary app screen embodiment FIG. 13D, the app indicates the user's current speed 1351, average speed 1352, maximum speed reached on the current trip 1353, elapsed distance 1354, elapsed time 1355, calories burned 1356, elevation 1357, and weather conditions 1358. As shown in FIG. 13D, a change tag button 1359 allows the user to change the view from current trip information to historical info on past trips or summarized report on aggregate of trips. Another "share info with friends" button 1360 allows the user to share their current location and other information with friends. In addition as shown in FIG. 13D, the app provides a recording button 1361 that permits the user to create aggregate trip information into user defined categories—i.e. Sunday morning trips, triathlon training, historical miles traveled, calories burned, elevation changes, weather, etc.

Figure 13E:
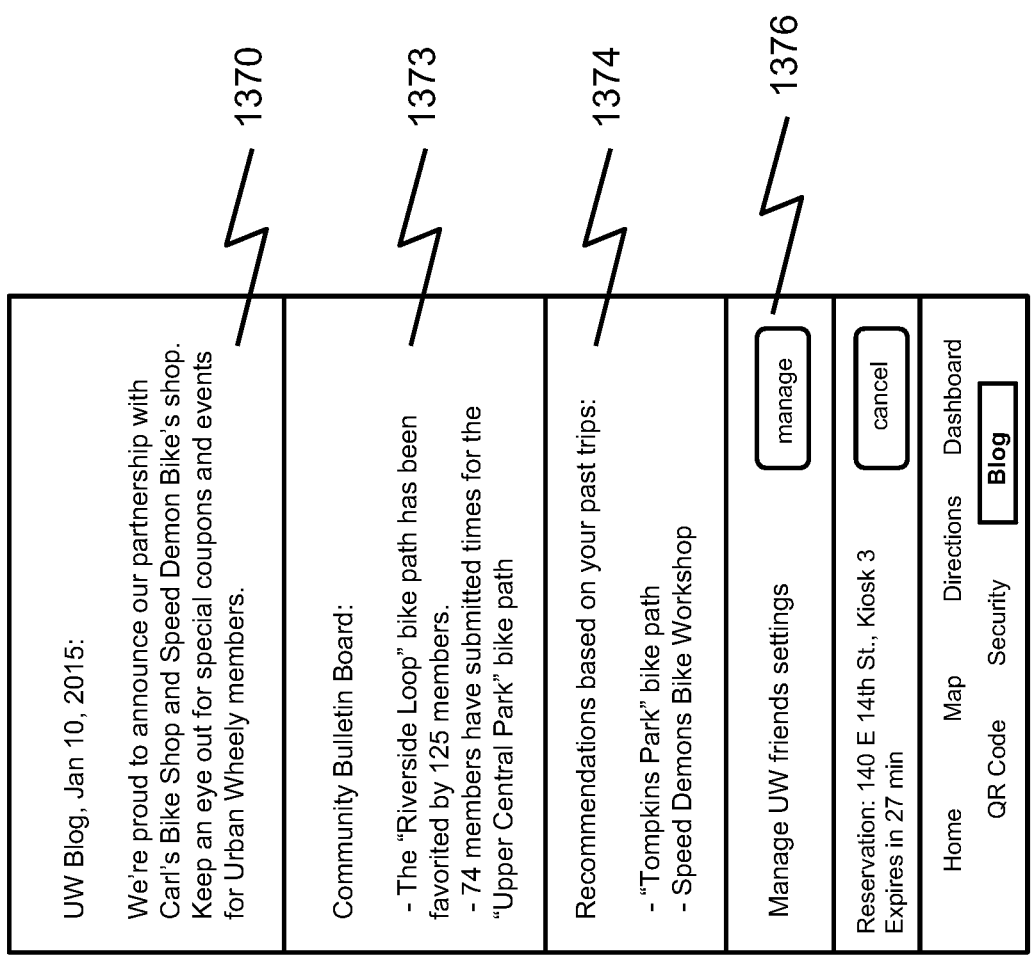

FIG. 13E is a screen diagram of the app that contains a portion 1370 illustrating an information—blog page, that allows users to read and write information about culture, events and their experiences. Another portion 1373 illustrated in FIG. 13E is for a community bulletin board that allows users to post various listings regarding events, items for sale, etc. FIG. 13E also illustrates an app screen portion 1374 that provides event recommendations based on trips. Finally, FIG. 13E illustrates a "manage" button 1376 that allows a user to manage their Urban Wheely friend settings.

FIG. 13F illustrates a security screen diagram for the app that provides information on tampering issues with a parked bike. As illustrated in FIG. 13F, the app provides a screen portion 1380 comprising remote video viewing from the kiosk of the user's locked bike, a trouble button 1382 for reporting a malfunctioning kiosk that won't lock, a status portion 1384 providing the current state of limit switches or sensors for kiosk locking mechanisms, a help desk call button 1386, and an emergency button 1388. In operation, if a bike is already locked and the QR reader malfunctions, trouble button 1382 will send notice to server 160 to activate a server-based kiosk unlock, which after verifying a user's identity, sends a secure unlock command to the kiosk to unlock the bike. If trouble button 1382 fails to unlock the bike, then the user will be directed to activate the help desk call button 1386 to get the bike unlocked. Where smart device 120 includes an accelerometer, a crash detection feature will preferably automatically contact a predetermined emergency contact number, if the user does not disarm the feature within a predetermined period of time. As also shown in FIG. 13F, the application provides an emergency button 1388 to provide a user in distress with one-button 911 calling, for example.

Figure 13G:
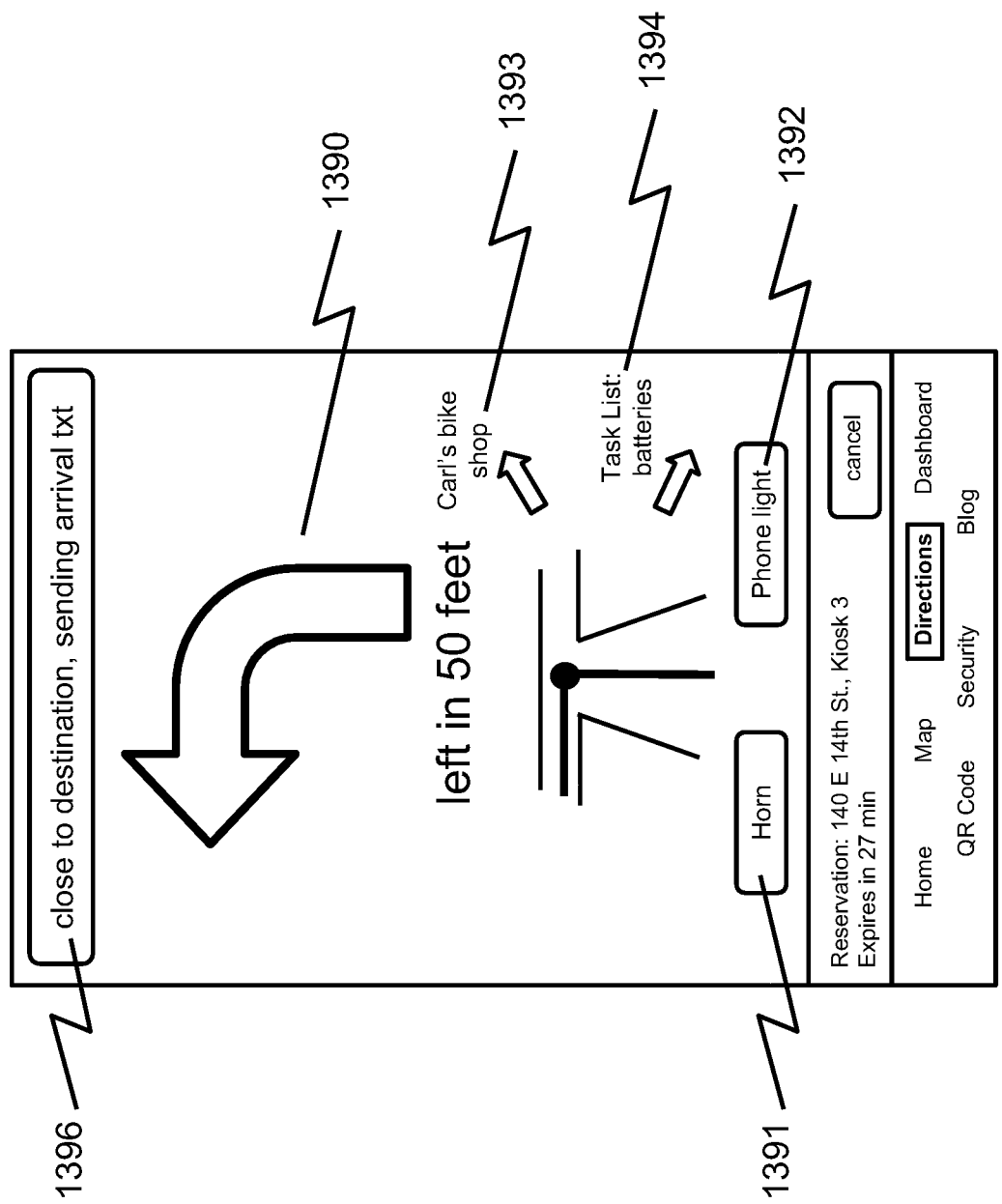

FIG. 13G illustrates a turn by turn direction screen for the app (which is updated for current traffic conditions). As shown in FIG. 13G, the app provides route direction information 1390 to the user. FIG. 13G also illustrates a horn button 1391, with customizable horn sound, a bicycle headlight button 1392, and advertisement icon 1393 directing the user to nearby advertised points of interest. FIG. 13G also illustrates possible alternative routes 1394 to find one or more items on a user's current task list.

FIG. 13G2 illustrates a pop-up screen 1395 for the app that provides a user with notification that they are receiving a call. As shown in FIG. 13G2, the app allows the user to take the call, ignore the call, send a default SMS text message, or provide an app generated SMS text message that provides the caller with precise information about the user's proximity to their destination.

Mission Control

Server 160 communicates with outside devices in a secure and encrypted manner, such as using https protocol. Server 160 handles membership signups and membership removal. Any personal data stored on the server will be protected to ensure security of user information. Credit card information will be processed but will not be stored on the server, in compliance with the Payment Card Industry Data Security Standard. The server can communicate with credit card companies for validation, payment and invoicing.

Server 160 logs and runs periodic checks to detect and record tampering with any kiosk, fraudulent attempts at logging on, attempting invalid access the server, attempting to spoof the communication between a device (such as a smartphone) and the server, using invalid credit card information, and any other suspicious or unauthorized behavior. Server 160 runs repeated checks to remove reservations that have expired. Server 160 copies backup server data to an offsite location so that if server 160 fails, a backup server can take over momentarily, providing redundancy and continued system operation.

Server 160 creates service tickets any time a kiosk has been flagged as needing service or there has been a report of suspicious activity near a kiosk. Server 160 keeps track of the progress for each ticket. Technicians sent to service kiosks as well as members of a service call center will be able to record on each stage of the service procedure on server 160. Technicians can also use a remote unlock feature by communicating through server 160 to unlock a bike kiosk.

For purposes of analyzing the current and future placement of parking stations, real-time analysis of free and used kiosks for individual stations and geographic areas for different times of day are generated. Server 160 analyzes user activity along with the geo spatial location, including but not limited to advertisements displayed, advertisements clicked, value paid by advertisers for each advertisement, user search queries and user search results. Server 160 also keeps track of the advertising displayed on each kiosk and whether a user is using the kiosk while the advertisement is displayed.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A system to secure a bicycle, comprising:
   a plurality of securing units, each securing unit comprising:
     a shroud that contains a first locking mechanism, wherein the shroud is adapted to obstruct access to a front wheel of the bicycle when the bicycle is inserted into the shroud; and
     the first locking mechanism comprising a pivoting lever arm that engages the front wheel of the bicycle and pivots when in contact with the front wheel of the bicycle as the front wheel is inserted into the shroud, the first locking mechanism having a locked state and an unlocked state that, when locked, prevents the bicycle from being removed;
   a computing device connected to a data network, wherein the computing device controls the state of the first locking mechanism; and
   a server computer connected to the data network, comprising a Web server;
   wherein the server computer loads and runs a computer program into a memory of the server computer that causes the server computer to perform operations, comprising:
     receiving identifying data from a user;
     verifying an identity of the user based on the identifying data;

responsive to verifying the identity of the user, determining whether the verified user has a bicycle secured with the system;

responsive to determining that the verified user does not have a bicycle secured with the system, sending a message to the computing device to indicate on a securing unit that the securing unit may be used to secure the bicycle; and sending a message to the computing device to lock the first locking mechanism associated with the indicated securing unit.

2. The system of claim 1, wherein the computer program further causes the server computer to determine securing units that are operational and available at particular locations.

3. The system of claim 2, wherein the computer program further causes the server computer to receive a location where the user wishes to secure the bicycle and determine which securing unit that may be used to secure the bicycle.

4. The system of claim 1, further comprising a second locking mechanism comprising opposing pins that prevent removal of a bicycle rear wheel rim.

5. The system of claim 1, further comprising a third locking mechanism, the third locking mechanism comprising a cable rope and a latch.

6. A system to secure a bicycle, comprising:
a plurality of securing units, each securing unit comprising:
a shroud that contains a first locking mechanism, wherein the shroud is adapted to obstruct access to a front wheel of the bicycle when the bicycle is inserted into the shroud;
the first locking mechanism comprising a pivoting lever arm that engages the front wheel of the bicycle and pivots when in contact with the front wheel of the bicycle as the front wheel is inserted into the shroud, the first locking mechanism having a locked state and an unlocked state that, when locked, prevents the bicycle from being removed;
a second locking mechanism comprising opposing pins that prevent removal of a bicycle rear wheel rim;
a computing device connected to a data network, wherein the computing device controls the state of the first locking mechanism; and
a server computer connected to the data network, comprising a Web server;

wherein the server computer loads and runs a computer program into a memory of the server computer that causes the server computer to perform operations, comprising:
receiving identifying data from a user;
verifying an identity of the user based on the identifying data;
responsive to verifying the identity of the user, determining whether the verified user has a bicycle secured with the system;
responsive to determining that the verified user does not have a bicycle secured with the system, determining securing units that are operational and available at particular locations, receiving a location where the user wishes to secure the bicycle, determining which securing unit that may be used to secure the bicycle and sending a message to the computing device to indicate on a securing unit that the securing unit may be used to secure the bicycle; and
sending a message to the computing device to lock the first locking mechanism associated with the indicated securing unit.

* * * * *